(12) United States Patent
Gronwald et al.

(10) Patent No.: US 9,006,300 B2
(45) Date of Patent: Apr. 14, 2015

(54) METHOD FOR MECHANICALLY STABILIZING NITROGEN-CONTAINING POLYMERS

(75) Inventors: Oliver Gronwald, Frankfurt (DE); Jörg Belack, Mainz (DE); Jochen Baurmeister, Eppstein (DE); Thomas Justus Schmidt, Wuerenlingen (CH); Seongwoo Choi, Gyeonggi-do (KR); Jung Ock Park, Gyeonggi-do (KR); Woo Sung Jeon, Gyeonggi-do (KR); Jung Seok Yi, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 270 days.

(21) Appl. No.: 13/509,432

(22) PCT Filed: Nov. 12, 2010

(86) PCT No.: PCT/EP2010/006912
§ 371 (c)(1),
(2), (4) Date: May 11, 2012

(87) PCT Pub. No.: WO2011/057804
PCT Pub. Date: May 19, 2011

(65) Prior Publication Data
US 2012/0231365 A1    Sep. 13, 2012

(30) Foreign Application Priority Data

Nov. 14, 2009   (EP) ..................................... 09014252

(51) Int. Cl.
| | |
|---|---|
| *H01M 8/10* | (2006.01) |
| *C08J 5/22* | (2006.01) |
| *C08L 79/06* | (2006.01) |
| *C08L 29/04* | (2006.01) |
| *H01M 8/02* | (2006.01) |

(52) U.S. Cl.
CPC .... H01M 8/0291 (2013.01); H01M 2008/1095 (2013.01); Y02E 60/50 (2013.01)

(58) Field of Classification Search
CPC ............. C08J 5/22; H01M 8/10; C08L 79/06; C08L 29/04
USPC ........................... 429/479; 521/27; 525/57, 56
See application file for complete search history.

(56) References Cited

U.S. PATENT DOCUMENTS

| | | | |
|---|---|---|---|
| 2006/0127705 A1 | 6/2006 | Kiefer et al. | |
| 2007/0184323 A1* | 8/2007 | Lee et al. | 429/33 |
| 2010/0068585 A1* | 3/2010 | Hoppes et al. | 429/30 |
| 2010/0273087 A1* | 10/2010 | Choi et al. | 429/483 |
| 2011/0113678 A1 | 5/2011 | Lange et al. | |

FOREIGN PATENT DOCUMENTS

| | | |
|---|---|---|
| EP | 1760110 A1 | 3/2007 |
| EP | 2036910 A1 | 3/2009 |
| EP | 2048183 A1 | 4/2009 |
| EP | 2056390 A1 | 5/2009 |
| EP | 2062891 A1 | 5/2009 |
| EP | 2253654 A1 | 11/2010 |
| WO | WO-00/44816 A1 | 8/2000 |
| WO | WO 0044816 A1 * | 8/2000 |
| WO | WO-2004/024796 A1 | 3/2004 |
| WO | WO 2004024796 A1 * | 3/2004 |
| WO | WO-2004063268 A1 | 7/2004 |
| WO | WO-2007099048 A2 | 9/2007 |

OTHER PUBLICATIONS

International Search Report for PCT/EP2010/006912 mailed Mar. 22, 2011.
Written Opinion of International Search Authority for PCT/EP2010/006912 mailed 2011.

* cited by examiner

*Primary Examiner* — Michael M Bernshteyn
(74) *Attorney, Agent, or Firm* — Drinker Biddle & Reath LLP

(57) ABSTRACT

A method for the production of a mechanically stabilized polyazole polymer membrane or film having the following steps:
 a) providing a membrane or film containing
  i.) a polyazole with at least one amino group in a repeating unit except the ones obtained by reacting aromatic and/or heteroaromatic diaminocarboxylic acids,
  ii.) at least one strong acid and
  iii.) at least one stabilizing reagent, the total content of stabilizing reagents in the membrane or film being within the range of from 0.01 to 30% by weight,
 b) performing the stabilization reaction in the membrane, immediately or in a subsequent processing step of the membrane,
 c) optionally doping the membrane obtained in accordance with step b) with a strong acid or concentrating the present strong acid by removal of present water,
wherein the stabilizing reagent contains at least one oxazine-based compound and wherein the polyazole polymer has at least 1.8 dl/g intrinsic viscosity.

21 Claims, No Drawings

METHOD FOR MECHANICALLY STABILIZING NITROGEN-CONTAINING POLYMERS

CROSS-REFERENCE TO RELATED APPLICATIONS

This application is a national stage application (under 35 U.S.C. §371) of PCT/EP2010/006912, filed Nov. 12, 2010, which claims benefit of European Application 09014252.2, filed Nov. 14, 2009.

The present invention relates to a method for mechanically stabilizing nitrogen-containing polymers through the reaction with suitable reagents and the use of such stabilized materials in polymer electrolyte membranes (PEMs), membrane electrode assemblies (MEAs) and PEM fuel cells.

Polymer electrolyte membranes (PEMs) are already known and are especially used in fuel cells. In this connection, polymers modified with sulphonic acid, in particular perfluorinated polymers are often used. Nafion™ from DuPont de Nemours, Willmington, USA is a prominent example of this. For the conduction of protons, a relatively high water content is required in the membrane, which typically amounts to 4-20 molecules of water per sulphonic acid group. The required water content, but also the stability of the polymer in connection with acidic water and the reaction gases hydrogen and oxygen usually restrict the operating temperature of the PEM fuel cell stacks to 80-100° C. Under pressure, the operating temperatures can be increased to >120° C. Otherwise, higher operating temperatures can not be realised without a loss of power in the fuel cell.

Due to system-specific reasons, however, operating temperatures in the fuel cell of more than 100° C. are desirable. The activity of the catalysts based on noble metals and contained in the membrane electrode assembly (MEA) is significantly improved at high operating temperatures. When the so-called reformates from hydrocarbons are used, the reformer gas in particular contains considerable amounts of carbon monoxide which usually have to be removed by means of an elaborate gas conditioning or gas purification process. The tolerance of the catalysts to the CO impurities is increased at high operating temperatures by up to several percent by volume of CO.

Furthermore, heat is produced during operation of fuel cells. However, the cooling of these systems to less than 80° C. can be very complex. Depending on the power output, the cooling devices can be constructed significantly less complex. This means that the waste heat in fuel cell systems that are operated at temperatures of more than 100° C. can be utilised distinctly better and therefore the efficiency of the fuel cell system via combined power and heat generation can be increased.

To achieve these temperatures, in general, membranes with new conductivity mechanisms are used. One approach to this end is the use of membranes which show electrical conductivity without employing water. A first development in this direction is set out in WO 96/13872, for example. For example, WO 96/13872 discloses the use of acid-doped polybenzimidazole membranes which are produced by means of a casting method.

A new generation of acid-containing polyazole membranes which likewise show electrical conductivity without employing water is described in WO 02/088219. The acid-containing polyazole membranes disclosed in WO 02/088219 already display a beneficial property profile.

On grounds of the intended applications for PEM fuel cells, however, the mechanical properties of the acid-containing polyazole membranes always have to be improved. For instance, such membranes are still relatively soft and thus can only withstand limited mechanical loads, the mechanical stability decreasing with an increasing temperature which can already lead to durability problems in the upper range of the typical operational window (ca. 160° C.-180° C.). Thus, an improvement of the mechanical properties, in particular of the stability of the membrane, while achieving a high conductivity is desirable.

Mechanical stabilization via bridging or cross-linking reactions is already generally known in the field of polymer technology. In this connection, however, one problem is that even though a polymer per se displays a sufficient mechanical strength, it can happen that the mechanical strength of the polymer decreases to an insufficient level due to impregnation/doping with a strong acid to impart proton conductivity.

First approaches to improve the mechanical stability of acid-containing polyazole membranes can be found in WO 00/44816 and WO 02/070592. In this connection, solutions of the polyazole polymer are initially prepared in an aprotic, polar, organic solvent and a bridging reagent is added to the solution. After forming a film, the organic solvent is removed and the bridging reaction is performed. The film is subsequently doped with a strong acid and used. The obtained acid-containing polyazole membranes display an improved mechanical stability as compared to non-bridged acid-containing polyazole membranes while achieving good conductivity.

In addition, cross-linking of polyazole polymers by the use of benzoxazine compounds is described in US 2009/0042093 A1, US 2009/0068543 A1, EP 2 036 910 A1, EP 2 048 183 A1, EP 2 056 390 A1, 2 058 321 A1, EP 2 055 706 A1, and US 2009/0117440 A1.

However, it has been found that bridging or cross-linking of polyazole polymers is indeed possible by means of the hitherto known methods, however, new limitations result from the use of aprotic, polar, organic solvents. Especially high-molecular weight polyazole polymers are only soluble to a limited extent or insoluble in the above-mentioned organic solvents and thus cannot be processed.

Therefore, the object of the present invention was to identify better alternatives to mechanically stabilize acid-containing polyazole membranes based on polyazole polymers. In addition, the good property profiles of acid-containing polyazole membranes, in particular with regard to conductivity, should be maintained or even improved. Furthermore, it should be possible to produce the membranes in a relatively simple manner and as inexpensive as possible.

These and other objects which directly result from the contexts discussed above are achieved by means of a method with all the features of the present claim 1. The derived dependent claims describe particularly practical variants of the method. Furthermore, the membranes and membrane electrode assemblies which can be obtained by the method as well as their use in fuel cells are protected.

The object of the present invention is a method for the production of mechanically stabilized polyazole polymers, comprising the following steps:
  a) providing a membrane comprising
    i.) polyazoles with at least one amino group in a repeating unit except the ones obtainable by reacting aromatic and/or heteroaromatic diaminocarboxylic acids,
    ii.) at least one strong acid and
    iii.) at least one stabilizing reagent, the total content of stabilizing reagents in the membrane being within the range of from 0.01 to 30% by weight, preferably 0.1 to 20% by weight and particularly preferably 0.5 to 10% by weight and the total amount of stabilizing reagents, based on the polyazole present in the membrane, preferably being in the range of from 20 to 80 mol %, b) performing the stabilization reaction in the membrane, immediately or in a subsequent processing step of the membrane, in particular in a PEM fuel cell, such as, for example, a membrane electrode assembly, c) if appropriate, additionally doping the membrane obtained in accordance with step b) with a strong acid or concentrating the present strong acid further by removal of present water, wherein the stabilizing agent comprises at least one oxazine-based compound.

By means of above-mentioned method, it is possible for the first time to obtain acid-containing, proton-conducting polyazole membranes based on stabilized high-molecular weight polyazole polymers. The hitherto known high-molecular weight polyazole polymers were either not stabilized; the hitherto known polyazole polymers modified by bridging and/or cross-linking comprise no high-molecular weight polyazole polymers.

Furthermore, by means of above-mentioned method, it is possible for the first time to obtain acid-containing, proton-conducting high-molecular weight polyazole polymers which have an improved modulus of elasticity without reducing the proton conductivity. Both properties are in particular of great importance for the use as a polymer electrolyte membrane for fuel cells. The electrolyte membrane obtainable by this way reduces problems observed when an electrolyte membrane formed of PBI alone is used, such as, a pinhole phenomenon caused by mechanical and chemical instability at high temperature.

Finally, the method according to the invention can be performed in a relatively simple manner on a large scale and inexpensive.

According to a first preferred variant, the method of the invention comprises the steps of:

a1-a) producing a film comprising polyazoles with at least one amino group in a repeating unit, a1-b) treating the film from step a) with a solution comprising (i) at least one strong acid and (ii) at least one stabilizing reagent, the total content of stabilizing reagents in the solution being within the range of from 0.01 to 30% by weight.

According to a first preferred variant, the method of the invention comprises the steps of:

a2-a) producing a solution comprising i.) polyazoles with at least one amino group in a repeating unit, ii.) at least one strong acid and iii.) at least one stabilizing reagent, the total content of stabilizing reagents in the membrane being within the range of from 0.01 to 30% by weight, a2-b) producing a membrane using the solution of step a-1).

Membrane Comprising Polyazoles

Within the context of the present invention, polyazoles is understood to mean such polymers in which the repeating unit in the polymer preferably contains at least one aromatic ring with at least one nitrogen atom. The aromatic ring is preferably a five-membered or six-membered ring with one to three nitrogen atoms which may be fused to another ring, in particular another aromatic ring. In this connection, individual nitrogen heteroatoms can also be replaced by oxygen, phosphorus and/or sulphur atoms. The heterocyclic aromatic rings are preferably present in the polymer backbone; however, they can also be present in the side chain. Particularly preferred are such alkaline polymers which comprise unsaturated five-membered or six-membered aromatic units in the repeating unit, the aromatic units containing 1-5 nitrogen atoms or, additional to nitrogen atoms, one or more other heteroatoms in the nucleus.

The polyazoles according to the invention have at least one amino group in a repeating unit. In this connection, the amino group can be present as a primary amino group ($NH_2$ group), a secondary amino group (NH group) or a tertiary group which are either part of the cyclic, optionally aromatic structure or part of a substituent on the aromatic unit.

Because of the amino group in the repeating unit, the polymer is alkaline and the repeating unit can preferably react with the stabilizing reagent via the amino group. With regard to the reactivity to the stabilizing reagent, the amino group in the repeating unit is preferably a primary or secondary amino group, particularly preferably a cyclic secondary amino group which conveniently belongs to the nucleus of the azole repeating unit.

The production of a film comprising polyazoles is already known. The production is carried out as described in WO 2004/024797, for example, and comprises the steps of A) mixing one or more aromatic tetramino compounds with one or more aromatic carboxylic acids or their esters, which contain at least two acid groups per carboxylic acid monomer, or mixing one or more aromatic and/or heteroaromatic diaminocarboxylic acids in polyphosphoric acid with formation of a solution and/or dispersion, B) applying a layer using the mixture in accordance with step A) to a support, C) heating the flat structure/layer obtainable in accordance with step B) under inert gas to temperatures of up to 350° C., preferably up to 280° C., with formation of the polyazole polymer, D) hydrolyzing the polymer film formed in step C) (until it is self-supporting), E) detaching the polymer film formed in step D) from the support, F) removing the present polyphosphoric acid or phosphoric acid and drying.

However, polyazoles obtainable by reacting aromatic and/or heteroaromatic diaminocarboxylic acids, such as AB-PBI and its derivatives, shall not be used in the present invention.

Membranes comprising i.) polyazoles with at least one amino group in a repeating unit except the ones obtainable by reacting aromatic and/or heteroaromatic diaminocarboxylic acids, ii.) at least one strong acid and iii.) at least one stabilizing reagent, the total content of stabilizing reagents in the membrane being within the range of from 0.01 to 30% by weight, can be obtained in a similar way, e.g. by dissolving the components in a suitable solvent and casting a membrane.

The aromatic and heteroaromatic tetramino compounds used in accordance with the invention include, amongst others, 3,3',4,4'-tetraminobiphenyl, 2,3,5,6-tetraminopyridine, 1,2,4,5-tetraminobenzene, 3,3',4,4'-tetraminodiphenyl sulphone, 3,3',4,4'-tetraminodiphenyl ether, 3,3',4,4'-tetraminobenzophenone, 3,3',4,4'-tetraminodiphenylmethane and 3,3',4,4'-tetraminodiphenyldimethylmethane as well as their salts, in particular their monohydrochloride, dihydrochloride, trihydrochloride and tetrahydrochloride derivatives.

The aromatic carboxylic acids used in accordance with the invention are dicarboxylic and tricarboxylic acids and tetracarboxylic acids or their esters or their anhydrides or their acid chlorides. The term aromatic carboxylic acids likewise also comprises heteroaromatic carboxylic acids. Preferably, the aromatic dicarboxylic acids are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenylsulphone-4,4'-dicarboxylic acid, biphenyl-4,4'-dicarboxylic acid, 4-trifluoromethylphthalic acid, 2,2-bis-(4-carboxyphenyl)hexafluoropropane, 4,4'-stilbenedicarboxylic acid, 4-carboxycinnamic acid or their C1-C20 alkyl esters or C5-C12 aryl esters or their acid anhydrides or their acid chlorides. The aromatic tricarboxylic acids, tetracarboxylic acids or their C1-C20 alkyl esters or C5-C12 aryl esters or their acid anhydrides or their acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids or their C1-C20 alkyl esters or C5-C12 aryl esters or their acid anhydrides or their acid chlorides are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids used in accordance with the invention are heteroaromatic dicarboxylic acids and tricarboxylic acids and tetracarboxylic acids or their esters or their anhydrides. Heteroaromatic carboxylic acids are understood to mean aromatic systems which contain at least one nitrogen, oxygen, sulphur or phosphorus atom in the aromatic group. These are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid and their C1-C20 alkyl esters or C5-C12 aryl esters or their acid anhydrides or their acid chlorides.

The content of tricarboxylic acid or tetracarboxylic acid (based on dicarboxylic acid used) is between 0 and 30 mol %, preferably 0.1 and 20 mol %, in particular 0.5 and 10 mol %.

Preferably, mixtures of at least 2 different aromatic carboxylic acids are used in step A). Particularly preferably, mixtures are used which also contain heteroaromatic carboxylic acids in addition to aromatic carboxylic acids. The mixing ratio of aromatic carboxylic acids to heteroaromatic carboxylic acids is between 1:99 and 99:1, preferably 1:50 to 50:1.

These mixtures are in particular mixtures of N-heteroaromatic dicarboxylic acids and aromatic dicarboxylic acids. Non-limiting examples of these are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenylsulphone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

The polyphosphoric acid used in step A) is a customary polyphosphoric acid as is available, for example, from Riedel-de Haen. The polyphosphoric acids $H_{n+2}P_nO_{3n+1}$ (n>1) usually have a concentration of at least 83%, calculated as $P_2O_5$ (by acidimetry). Instead of a solution of the monomers, it is also possible to produce a dispersion/suspension.

The mixture produced in step A) has a weight ratio of polyphosphoric acid to the sum of all monomers of from 1:10,000 to 10,000:1, preferably 1:1000 to 1000:1, in particular 1:100 to 100:1.

The layer formation in accordance with step B) is performed by means of measures known per se (pouring, spraying, application with a doctor blade) which are known from the prior art of polymer film production. Every support that is considered as inert under the conditions is suitable as a support. However, besides these inert supports, other supports, such as, for example, polymer films, woven fabrics and nonwovens, which form a bond with the layer formed in step B) and constitute a laminate are also suitable. To adjust the viscosity, phosphoric acid (conc. phosphoric acid, 85%) can be added to the solution, where required. Thus, the viscosity can be adjusted to the desired value and the formation of the membrane be facilitated.

The layer produced in accordance with step B) has a thickness which is adapted to the subsequent use and is not subject to any limitation. Usually, the formed layer has a thickness between 1 and 5,000 μm, preferably between 1 and 3,500 μm, in particular between 1 and 100 μm.

The polymer formed in step C) and based on polyazole contains recurring azole units of the general formula (I) and/or (III) and/or (IV) and/or (V) and/or (VI) and/or (VII) and/or (VIII) and/or (IX) and/or (X) and/or (XI) and/or (XII) and/or (XIII) and/or (XIV):

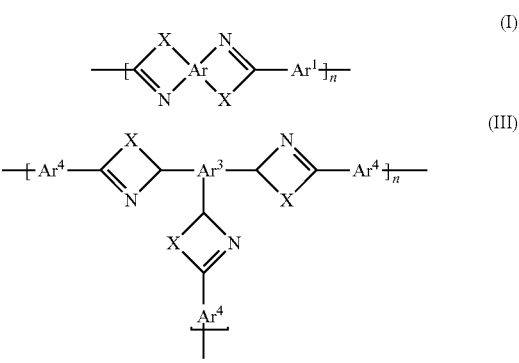

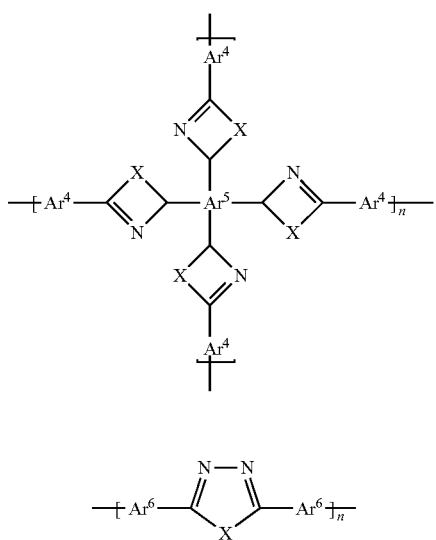 (IV)

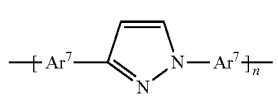 (V)

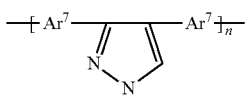 (VI)

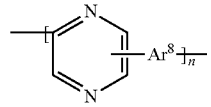 (VII)

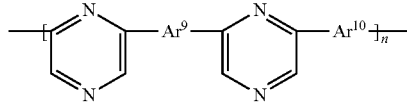 (VIII)

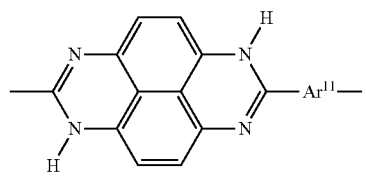 (IX)

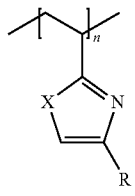 (X)

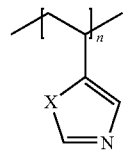 (XI)

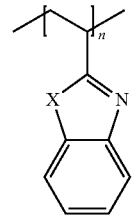 (XII)

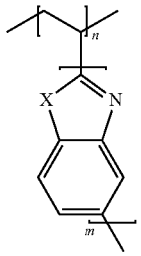 (XIII)

wherein

Ar are the same or different and are each a tetravalent aromatic or heteroaromatic group which may be mononuclear or polynuclear, $Ar^1$ are the same or different and are each a divalent aromatic or heteroaromatic group which may be mononuclear or polynuclear, $Ar^2$ are the same or different and are each a divalent or trivalent aromatic or heteroaromatic group which may be mononuclear or polynuclear, $Ar^3$ are the same or different and are each a trivalent aromatic or heteroaromatic group which may be mononuclear or polynuclear, $Ar^4$ are the same or different and are each a trivalent aromatic or heteroaromatic group which may be mononuclear or polynuclear, $Ar^5$ are the same or different and are each a tetravalent aromatic or heteroaromatic group which may be mononuclear or polynuclear, $Ar^6$ are the same or different and are each a divalent aromatic or heteroaromatic group which may be mononuclear or polynuclear, $Ar^7$ are the same or different and are each a divalent aromatic or heteroaromatic group which may be mononuclear or polynuclear, $Ar^8$ are the same or different and are each a trivalent aromatic or heteroaromatic group which may be mononuclear or polynuclear, $Ar^9$ are the same or different and are each a divalent or trivalent or tetravalent aromatic or heteroaromatic group which may be mononuclear or polynuclear, $Ar^{10}$ are the same or different and are each a divalent or trivalent aromatic or heteroaromatic group which may be mononuclear or polynuclear, $Ar^{11}$ are the same or different and are each a divalent aromatic or heteroaromatic group which may be mononuclear or polynuclear, X are the same or different and represent oxygen, sulphur or an amino group which carries a hydrogen atom, a group having 1-20 carbon atoms, preferably a branched or unbranched alkyl or alkoxy group, or an aryl group as a further radical, R are the same or different and represent hydrogen, an alkyl group and an aromatic group, and n, m are each an integer greater than or equal to 10, preferably greater than or equal to 100,
except the ones obtainable by reacting aromatic and/or heteroaromatic diaminocarboxylic acids.

Preferred aromatic or heteroaromatic groups are derived from benzene, naphthalene, biphenyl, diphenyl ether, diphenylmethane, diphenyldimethylmethane, bisphenone, diphenylsulphone, quinoline, pyridine, bipyridine, pyridazine, pyrimidines, pyrazine, triazine, tetrazine, pyrrole, pyrazole, anthracene, benzopyrrole, benzotriazole, benzooxathiadiazole, benzooxadiazole, benzopyridine, benzopyrazine, benzopyrazidine, benzopyrimidine, benzotriazine, indolizine, quinolizine, pyridopyridine, imidazopyrimidine, pyrazinopyrimidine, carbazole, aziridine, phenazine, benzoquinoline, phenoxazine, phenothiazine, acridizine, benzopteridine, phenanthroline and phenanthrene which optionally also can be substituted.

In this case, $Ar^1, Ar^4, Ar^6, Ar^7, Ar^8, Ar^9, Ar^{10}, Ar^{11}$ can have any substitution pattern, in the case of phenylene, for example, $Ar^1, Ar^4, Ar^6, Ar^7, Ar^8, Ar^9, Ar^{10}, Ar^{11}$ can be ortho-phenylene, meta-phenylene and para-phenylene. Particularly preferred groups are derived from benzene and biphenylene which may also be substituted.

Preferred alkyl groups are short-chain alkyl groups having from 1 to 4 carbon atoms, such as, e.g., methyl, ethyl, n-propyl or i-propyl and t-butyl groups.

Preferred aromatic groups are phenyl or naphthyl groups. The alkyl groups and the aromatic groups can be substituted.

Preferred substituents are halogen atoms, such as, e.g., fluorine, amino groups, hydroxy groups or short-chain alkyl groups, such as, e.g., methyl or ethyl groups.

Preference is given to polyazoles having recurring units of the formula (I) in which the radicals X within a recurring unit are the same.

The polyazoles can in principle also have different recurring units wherein their radicals X are different, for example. However, there are preferably only identical radicals X in a recurring unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetrazapyrenes).

In another embodiment of the present invention, the polymer containing recurring azole units is a copolymer or a blend which contains at least two units of the formulae (I) to (XIV) which differ from one another. The polymers can be in the form of block copolymers (diblock, triblock), random copolymers, periodic copolymers and/or alternating polymers.

In a particularly preferred embodiment of the present invention, the polymer containing recurring azole units is a polyazole which only contains units of the formulae (I) and/or (II).

The number of recurring azole units in the polymer is preferably an integer greater than or equal to 10. Particularly preferred polymers contain at least 100 recurring azole units.

Within the context of the present invention, preference is given to polymers containing recurring benzimidazole units. Some examples of the most appropriate polymers contain recurring benzimidazole units and are represented by the following formulae:

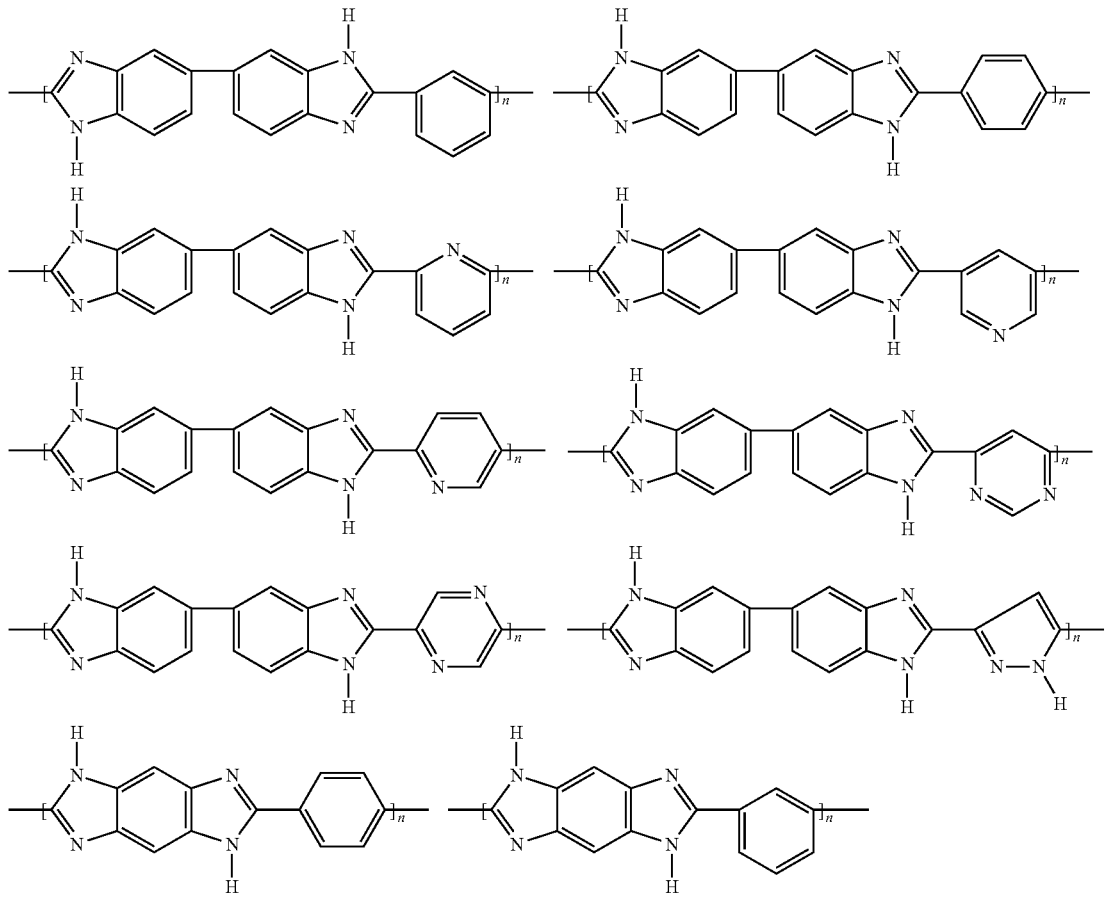

-continued
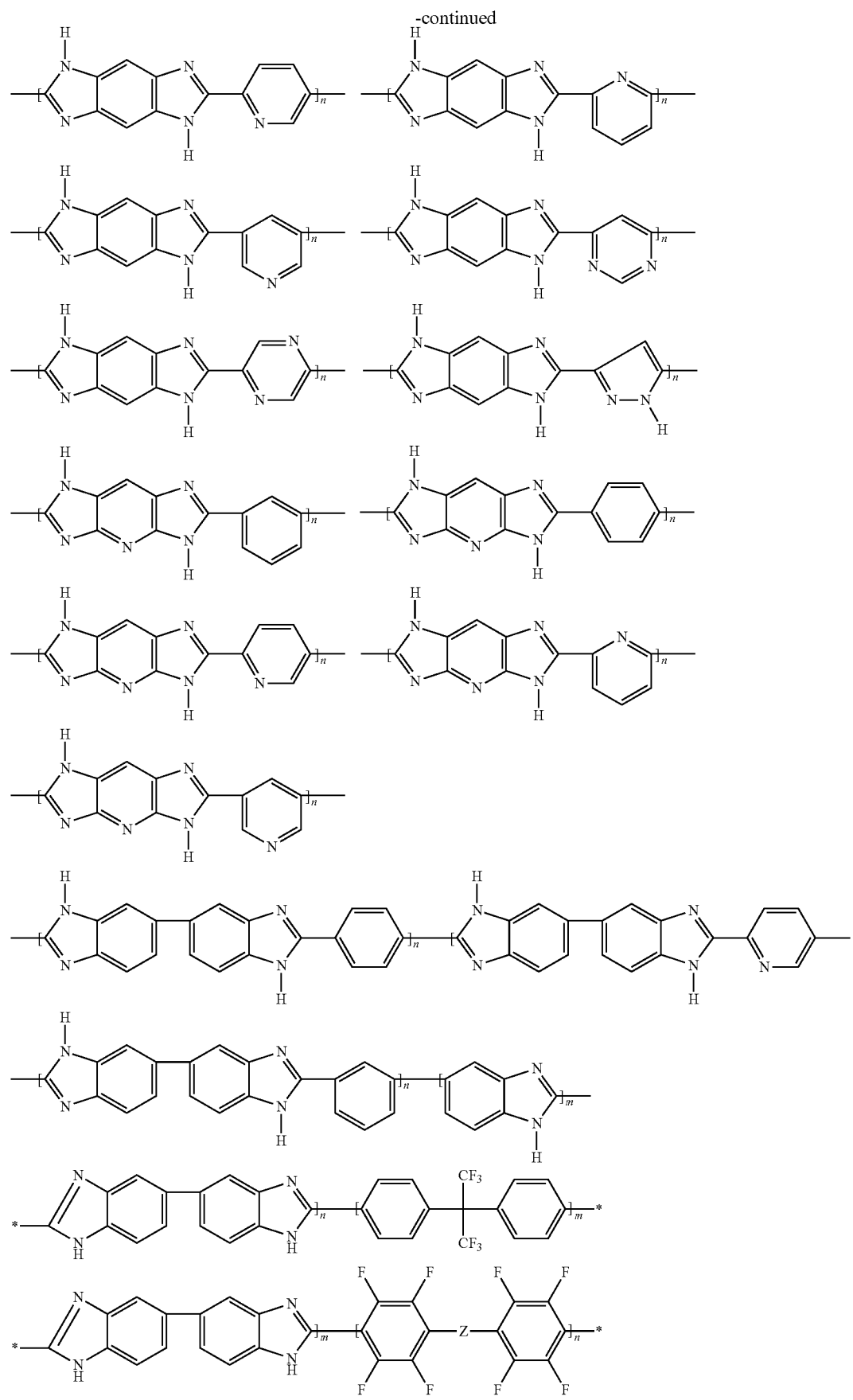

-continued

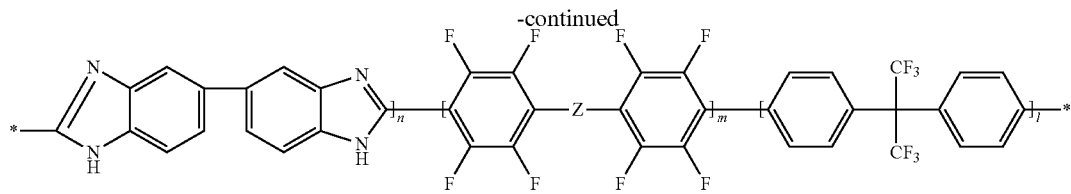

In the last formula, the azole units and both the fluorinated moieties may be linked to each other in any order. The preparation can result in a polymer, random copolymer or block copolymer.

Furthermore, n and m, in each case independently of another, are in above formulae an integer greater than or equal to 10, preferably greater than or equal to 100.

The procedure according to the invention is in principle suitable for any polyazole, irrespective of the molecular weight. However, it has proven to be particularly advantageous for stabilizing high-molecular weight polyazoles which cannot be obtained in any other way. High-molecular weight polyazoles, but especially polybenzimidazoles are characterized by a high molecular weight which, measured as the intrinsic viscosity, is at least 1.8 dl/g, preferably at least 2.0 dl/g, particularly preferably at least 2.5 dl/g. The upper limit is preferably at most 8.0 dl/g, particularly preferably at most 6.8 dl/g, very particularly preferably at most 6.5 dl/g. Thus, the molecular weight is distinctly higher than that of customary polybenzimidazole (IV<1.1 dl/g).

The determination of the intrinsic viscosity is performed as described below: To this end, the polymer is initially dried at 160° C. for 2 h. 100 mg of the polymer thus dried are then dissolved in 100 ml of concentrated sulphuric acid (at least 96% by weight) at 80° C. for 4 h. The inherent or intrinsic viscosity is determined from this solution in accordance with ISO 3105 (DIN 51562, ASTM D2515) with an Ubbelohde viscometer at a temperature of 25° C.

If the mixture in accordance with step A) also contains tricarboxylic acids or tetracarboxylic acid, branching/cross-linking of the formed polymer is achieved therewith along the backbone. This contributes to an improvement in the mechanical property.

In a variant of the method, the formation of oligomers and/or polymers can already be brought about by heating the mixture from step A) to temperatures of up to 350° C., preferably up to 280° C. Depending on the selected temperature and duration, it is than possible to dispense partly or fully with the heating in step C). This variant is also suitable for the production of the films required for step a), comprising preferably high-molecular weight polyazoles.

Furthermore, it has been found that when using aromatic dicarboxylic acids (or heteroaromatic dicarboxylic acids), such as isophthalic acid, terephthalic acid, 2,5-dihydroxy-terephthalic acid, 4,6-dihydroxyisophthalic acid, 2,6-dihydroxyisophthalic acid, diphenic acid, 1,8-dihydroxynaphthalene-3,6-dicarboxylic acid, Diphenylether-4,4'-dicarboxylic acid, benzophenone-4,4'-dicarboxylic acid, diphenylsulphone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, the temperature in step C)—or if it is desired that the formation of oligomers and/or polymers already occurs in step A)—within a range of up to 300° C., preferably between 100° C. and 250° C. is favourable.

The treatment of the polymer layer produced in accordance with step C) to produce the film required for step b) may be performed in several ways.

In one variant (variant A), the present polyphosphoric acid or phosphoric acid is left in the membrane as it does not interfere with the further treatment. In this case, the treatment of the polymer layer produced in accordance with step C) is performed in the presence of moisture at temperatures and for a sufficient period of time until the layer exhibits a sufficient strength for the intended use. The treatment can be effected to the extent that the membrane is self-supporting so that it can be detached from the support without any damage (step E). Steps D) and E) can also be performed simultaneously or shortly after one another. Furthermore, it is possible to connect steps D) and E) with the measures of steps b), c) and optionally d). For example, the hydrolysis in step D) may be carried out by treating the polymer film formed in accordance with step C) with the solution comprising (i) at least one strong acid and (ii) at least one stabilizing reagent, the total content of stabilizing reagents in the solution being within the range of from 0.01 to 30% by weight. The implementation of the stabilization reaction in accordance with step c) may be combined with thermal drying or further concentration of the present acid.

The treatment of the polymer film in step D) is performed at temperatures of more than 0° C. and less than 150° C., preferably at temperatures between 10° C. and 120° C., in particular between room temperature (20° C.) and 90° C., in the presence of moisture or water and/or steam and/or water-containing phosphoric acid of up to 85%. The treatment is preferably performed at normal pressure, but can also be carried out with action of pressure. It is essential that the treatment takes place in the presence of sufficient moisture whereby the present polyphosphoric acid contributes to the solidification of the polymer film by means of partial hydrolysis with formation of low-molecular weight polyphosphoric acid and/or phosphoric acid. Due to the hydrolysis step, a sol-gel transition takes place which is responsible for the particular shape of the membrane.

The partial hydrolysis of the polyphosphoric acid in step D) leads to a solidification of the polymer film such that this becomes self-supporting and furthermore results in a reduction in the layer thickness.

The intramolecular and intermolecular structures present in the polyphosphoric acid layer in accordance with step B) lead to an ordered membrane formation in step C) which is responsible for the good properties of the formed polymer film.

The upper temperature limit for the treatment in accordance with step D) is typically 180° C. With extremely short action of moisture, for example from extremely overheated steam, this steam can also be hotter. The duration of the treatment is substantial for the upper limit of the temperature.

The partial hydrolysis (step D) can also take place in climatic chambers where the hydrolysis can be specifically controlled with defined moisture action. In this connection, the moisture can be specifically set via the temperature or saturation of the surrounding area in contact with it, for example gases such as air, nitrogen, carbon dioxide or other suitable gases, or steam. The duration of the treatment depends on the parameters chosen as aforesaid.

Furthermore, the duration of the treatment of the membrane depends on the thickness.

Typically, the duration of the treatment amounts to between a few seconds to minutes, for example with the action of overheated steam, or up to whole days, for example in the open air at room temperature and low relative humidity. Preferably, the duration of the treatment is between 10 seconds and 300 hours, in particular 1 minute to 200 hours.

If the partial hydrolysis is performed at room temperature (20° C.) with ambient air having a relative humidity of 40-80%, the duration of the treatment is between 1 and 200 hours.

The polymer film obtained in accordance with step D) is preferably formed in such a way that it is self-supporting, i.e. it can be detached from the support without any damage in accordance with step E) and then directly processed further, if applicable.

If the polymer film obtained in accordance with step C) on the support is processed further, for example to a composite membrane, it is possible to dispense partly or fully with step D).

If the polyphosphoric acid or phosphoric acid present in accordance with step C) is left in the membrane (variant A), the treatment of the film in step b) may be carried out in a hydrolysis bath analogous to step D). In this connection, the polyphosphoric acid or phosphoric acid present in the membrane is replaced completely or at least partly by the solution comprising (i) at least one strong acid and (ii) at least one stabilizing reagent. The implementation of the stabilization reaction in accordance with step c) can be realized in the hydrolysis bath or afterwards, preferably immediately afterwards. Depending on the stability of the membrane, the treatment in a hydrolysis bath can take place on a support or else the support can already be removed beforehand such that step E) can optionally be dispensed with or be brought forward.

This variant is also an object of the present invention.

In another variant (variant B), the present polyphosphoric acid or phosphoric acid is removed from the membrane. To this end, the treatment of the polymer layer produced in accordance with step C) is performed in the presence of moisture at temperatures and for a sufficient period of time until the layer exhibits a sufficient strength for further treatment. Thus, the hydrolysis in step D) and the detachment in step E) may also take place simultaneously. This simplification of the hydrolysis is especially possible when the present polyphosphoric acid or phosphoric acid is to be removed completely and does not have to be present for the treatment in step b) as a fresh solution comprising a strong acid is once more introduced at a later point in time in step b).

If the polyphosphoric acid or phosphoric acid still present in the polymer film is to be removed in accordance with step F), this can be carried out with a treatment liquid within a temperature range of between room temperature (20° C.) and the boiling temperature of the treatment liquid (at normal pressure).

Within the context of the invention and the context of step F), solvents being liquid at room temperature [i.e. 20° C.], selected from the group consisting of alcohols, ketones, alkanes (aliphatic and cycloaliphatic), ethers (aliphatic and cycloaliphatic), glycols, esters, carboxylic acids, wherein the afore-mentioned members of the group may be halogenated, water and mixtures of these are used as the treatment liquid.

Preferably, use is made of C1-C10 alcohols, C2-C5 ketones, C1-C10 alkanes (aliphatic and cycloaliphatic), C2-C6 ethers (aliphatic and cycloaliphatic), C2-C5 esters, C1-C3 carboxylic acids, dichloromethane, water and mixtures of these.

The treatment liquid introduced in step F) is subsequently removed again. This preferably takes place by drying, the temperature and ambient pressure parameters being chosen as a function of the partial vapour pressure of the treatment liquid. Usually, the drying process takes place at normal pressure and temperatures of between 20° C. and 200° C. A gentler drying may also take place in vacuo. Instead of the drying process, the membrane may also be dabbed and thus be freed of excess treatment liquid. The order is not critical.

The production of the film comprising polyazoles can also be carried out by means of a variation of the above-mentioned method. To this end, the following steps are performed:

i) reacting one or more aromatic tetramino compounds with one or more aromatic carboxylic acids or their esters, which contain at least two acid groups per carboxylic acid monomer, or one or more aromatic and/or heteroaromatic diaminocarboxylic acids in the melt at temperatures of up to 350° C., preferably up to 300° C., ii) dissolving the solid prepolymer obtained in accordance with step i) in polyphosphoric acid, iii) heating the solution obtainable in accordance with step ii) under inert gas to temperatures of up to 300° C., preferably up to 280° C., with formation of the dissolved polyazole polymer, iv) forming a membrane using the solution of the polyazole polymer in accordance with step iii) on a support and v) treating the membrane formed in step iv) until it is self-supporting.

Besides the above-mentioned variation, the formation may also be carried out by means of the following steps:

I) dissolving of polymers, particularly polyazoles in phosphoric acid,

II) heating the solution obtainable in accordance with step I) under inert gas to temperatures of up to 400° C., III) forming a membrane using the solution of the polymer in accordance with step II) on a support and IV) treating the membrane formed in step III) until it is self-supporting.

In both variations, steps E) and F) are effected after step v) or IV), both variants A) and B) also being possible.

The preferred embodiments of the raw materials and process parameters mentioned in each case were already set out with regard to steps A), B), C) and D) and are also valid for this variant.

Membrane Comprising Polyazoles and Further Blend Components

In addition to the above-mentioned, preferably high-molecular weight polyazole, a blend of one or more preferably high-molecular weight polyazoles with another polymer can also be used. In this case, the function of the blend component is essentially to improve the mechanical properties and reduce the cost of material. Here, polyethersulphone is a preferred blend component, as described in German patent application No. 10052242.4.

The preferred polymers which can be employed as the blend component include, amongst others, polyolefines, such as poly(chloroprene), polyacetylene, polyphenylene, poly(p-xylylene), polyarylmethylene, polyarmethylene, polystyrene, polymethylstyrene, polyvinyl alcohol, polyvinyl acetate, polyvinyl ether, polyvinyl amine, poly(N-vinyl acetamide), polyvinyl imidazole, polyvinyl carbazole, polyvinyl pyrrolidone, polyvinyl pyridine, polyvinyl chloride, polyvinylidene chloride, polytetrafluoroethylene, polyhexafluoropropylene, copolymers of PTFE with hexafluoropropylene, with perfluoropropylvinyl ether, with trifluoronitrosomethane, with sulphonyl fluoride vinyl ether, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular of norbornenes; polymers having C—O bonds in the backbone, for example polyacetal, polyoxymethylene, polyether, polypropylene oxide, polyepichlorohydrin, polytetrahydrofuran, polyphenylene oxide, polyether ketone, polyester, in particular polyhydroxyacetic acid, polyethyleneterephthalate, polybutyleneterephthalate, polyhydroxybenzoate, polyhydroxypropionic acid, polypivalolacton, polycaprolacton, polymalonic acid, polycarbonate; polymers having C—S bonds in the backbone, for example polysulphide ether, polyphenylenesulphide, polyethersulphone; polymers having C—N bonds in the backbone, for example polyimines, polyisocyanides, polyetherimine, polyaniline, polyamides, polyhydrazides, polyurethanes, polyimides, polyazoles, polyazines; liquid-crystalline polymers, in particular Vectra, and inorganic polymers, for example polysilanes, polycarbosilanes, polysiloxanes, polysilicic acid, polysilicates, silicones, polyphosphazenes and polythiazyl.

For the application in fuel cells with a long-term service temperature above 100° C., such blend polymers are preferred which have a glass transition temperature or Vicat softening point VST/A/50 of at least 100° C., preferably at least 150° C. and very particularly preferably at least 180° C. Here, preference is given to polysulphones with a Vicat softening temperature VST/A/50 of 180° C. to 230° C.

The preferred polymers include polysulphones, in particular polysulphone having aromatic groups in the backbone. According to a particular aspect of the present invention, preferred polysulphones and polyethersulphones have a melt volume rate MVR 300/21.6 of less than or equal to 40 cm³/10 min, in particular less than or equal to 30 cm³/10 min and particularly preferably less than or equal to 20 cm³/10 min, measured in accordance with ISO 1133.

Membrane Comprising Polyazoles and Further Additives

To further improve the future properties in terms of application technology, still further fillers, in particular proton-conducting fillers may be added to the preferably high-molecular weight polyazole film or the acid-containing polyazole membrane.

Non-limiting examples of proton-conducting fillers are
sulphates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$,
phosphates such as $Zr_3(PO_4)_4$, $Zr(HPO_4)_2$, $HZr_2(PO_4)_3$, $UO_2PO_4.3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$,
polyacids such as $H_3PW_{12}O_{40}.nH_2O$ (n=21-29), $H_3SiW_{12}O_{40}.nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$,
selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$,
phosphides such as ZrP, TiP, HfP,
oxides such as $Al_2O_3$, $Sb_2O_5$, $ThO_2$, $SnO_2$, $ZrO_2$, $MoO_3$,
silicates such as zeolites, zeolites($NH_{4+}$), phyllosilicates, tectosilicates, H-natrolites, H-mordenites, $NH_4$-analcines, $NH_4$-sodalites, $NH_4$-gallates, H-montmorillonites, other condensation products of orthosilicic acid $Si(OH)_4$ as well as its salts and esters, polysiloxanes of the general formula $H_3Si$—$(O$—$SiH_2$—$)_n$—$O$—$SiH_3$, especially also other clay materials, such as montmorillonites, bertonites, kaolinites, pyrophillites, talcum, chlorites, muscovites, mica, smectites, halosites, vermiculites and hydrotalcites,
acids such as $HClO_4$, $SbF_5$,
fillers such as carbides, in particular SiC, $Si_3N_4$, fibres, in particular glass fibres, glass powders and/or polymer fibres, preferably based on polyazoles, also partially cross-linked.

These additives can be included in the proton-conducting polymer membrane in usual amounts, however, the positive properties of the membrane, such as great conductivity, long service life and high mechanical stability should not be affected too much by the addition of too large amounts of additives. Generally, the membrane comprises not more than 80% by weight, preferably not more than 50% by weight and particularly preferably not more than 20% by weight, of additives. In this connection, the additives can be present in different particle shapes and particle sizes or also mixtures, however, particularly preferably in the form of nanoparticles.

Stabilizing Solution and Reaction

The stabilization reaction of the membrane comprising
i.) polyazoles with at least one amino group in a repeating unit, except the ones obtainable by reacting aromatic and/or heteroaromatic diaminocarboxylic acids
ii.) at least one strong acid and
iii.) at least one stabilizing reagent, the total content of stabilizing reagents in the membrane being within the range of from 0.01 to 30% by weight, preferably 0.1 to 20% by weight and particularly preferably 0.5 to 10% by weight and the total amount of stabilizing reagents, based on the polyazole present in the membrane, preferably being in the range of from 20 to 80 mol %,
takes place in step b).

In this connection, suitable stabilizing reagents comprise in particular any compounds which are capable of mechanically stabilizing the preferably high-molecular weight polyazole. As polymer electrolyte membranes, such stabilized acid-containing polyazole membranes based on preferably high-molecular weight polyazoles are chemically and physically significantly more stable and allow for an improved operation of high-temperature fuel cells using such polymer electrolyte membranes.

The organic compounds used as the stabilizing reagent have to display sufficient stability to the strong acid present in the solution. Furthermore, they have to show sufficient solubility in the strong acid such that the total content of stabilizing reagents in the solution in step b) is conveniently within a range of from 0.01 to 20% by weight, preferably 0.1 to 15% by weight, preferably 0.25 to 10% by weight, in particular 1 to 5% by weight. If the stabilizing reagents do not display sufficient solubility in the strong acid, minor amounts of further inert solubilizers may also be added.

Overall, however, should the solubility conveniently be sufficient such that the solution in step b) is capable to allow for a total content of stabilizing reagent within a range of from 0.01 to 100 mol % of the reagent—based on the polyazole present in the film (per repeating unit of the polyazole polymer)—, preferably 10 to 80 mol %, in particular 15 to 65 mol %.

If the chosen proportion of stabilizing reagent is too low, the mechanical strength of the polymer membrane is not sufficiently improved; if the chosen proportion is too high, the membrane becomes brittle and the property profile of the membrane becomes insufficient.

Furthermore, it is possible to include the electrolyte in the cross-linking reaction. In this connection, the stabilizing reagent can partly or fully react with the electrolyte or interact with the latter. By means of this reaction or interaction, a mechanical and/or chemical stabilization of the membrane as well as to the phosphoric acid environment is likewise achieved. In this connection, including the electrolyte in the stabilizing reaction can lead to a decrease in acid strength.

The proton conductivity of the stabilized membranes is conveniently between 30 and 220 mS/cm, preferably at least 40-200 mS/cm, particularly preferably between 50 and 200 mS/cm at 160° C.

The proton conductivities are measured by means of impedance spectroscopy (Zahner IM5 or IM6 spectrometer) and a 4-point measurement cell. In this connection, a particular procedure is as follows:

To prepare the specimens, about 3.5×7 cm large pieces are cut out in a practical manner and the membrane specimens are mangled with a roll-shaped weight of 500 g to remove supernatant acid. The thickness of the specimens is advantageously determined at 3 points with a Mitutoyo thickness measurement device of the type "Absolute Digmatic" and averaged (beginning, centre and end of the specimen strip). The specimen is conveniently fixed in the measurement cell, as depicted in Fig. 1.

The numerals designate:
(1): L
(3): $U_+$
(5): U.
(7): $I_+$
(9): connector
(11): Pt wire
(13): gasket
(15): membrane
(17): Pt plate The screws of the test cell are preferably finger-tightened and the cell is advantageously transferred to a controlled oven in which a temperature-frequency programme in accordance with table 1 is run.

TABLE 1

| Frequency range | Lowest frequency (lower limit) | 1 Hz |
| --- | --- | --- |
|  | Highest frequency (upper limit) | 100 kHz |
|  | Initial frequency (frequency at the start) | 10 kHz |
| Steps per decade | Above 66 Hz | 20 |
|  | Below 66 Hz | 5 |
| Number of measuring Periods | Above 66 Hz | 10 |
|  | Below 66 Hz | 4 |

The oven programme is started and impedance spectra are measured with a Zahner-Elektrik impedance spectrometer IM6 featuring a 4-point dry-measurement cell at 20° C. to 160° C. and inversely from 160° C. to 20° C., preferably in increments of 20° C., a dwell time of 10 min advantageously taking place before the measurement. The spectrum is saved and preferably evaluated in accordance with the methods of Bode and Niquist known from the literature. Here, the proton conductivity is calculated using the following equation:

$$\sigma = \frac{l}{R \cdot b \cdot d} \left[ \frac{S}{cm} \right]$$

I (spacing of the contacts)=2 cm, b (membrane width)=3.5 cm, d=membrane thickness (cm), R=measured resistance (Ohm)

According to the present invention, the stabilizing agent comprises at least one oxazine-based compound. Oxazines are heterocyclic compounds containing one oxygen and one nitrogen. Many isomers exist depending on the relative position of the heteroatoms and relative position of the double bonds. Preferred structures are as follows.

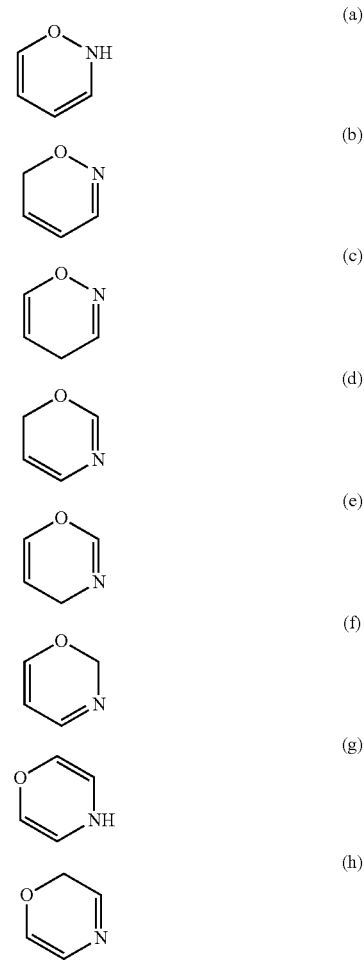

The term "oxazine-based compound" refers to a compound comprising at least one oxazine moiety, preferably having a structure (a) to (h), or a dihydro derivate of said oxazine moiety, preferably having a structure (a) to (n). Dihydro derivates of the moities (d) to (f) are most suitable in the context of the present invention.

Benzoxazine-based compounds are preferred in the present invention.

Particularly suitable benzoxazine-based compounds comprise a first benzoxazine-based monomer represented by Formula 1 below and/or a second benzoxazine-based monomer represented by Formula 2 below and/or a polymer thereof.

Formula 1

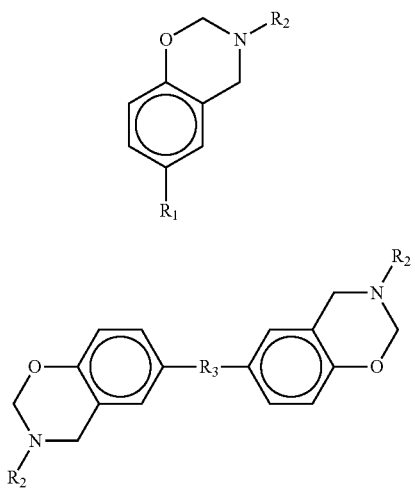

Formula 2

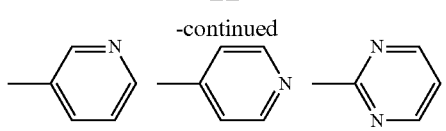

where, R₁ is a hydrogen atom, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_2$-$C_{20}$ heteroaryl group, a substituted or unsubstituted $C_4$-$C_{20}$ cycloalkyl group or a substituted or unsubstituted $C_2$-$C_{20}$ heterocyclic group, a halogen atom, a hydroxy group, or a cyano group, R₂, is a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_2$-$C_{20}$ heteroaryl group, a substituted or unsubstituted $C_3$-$C_{20}$ heteroarylalkyl group, a substituted or unsubstituted $C_4$-$C_{20}$ a carbocyclic group, a substituted or unsubstituted $C_5$-$C_{20}$ carbocyclic alkyl group, a substituted or unsubstituted $C_2$-$C_{20}$ heterocyclic group, or a substituted or unsubstituted $C_3$-$C_{20}$ heterocyclic alkyl group, R₃, is a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, or —SO₂—.

The first benzoxazine-based monomer is preferably used as a monomer for forming a polymer matrix used to form an electrolyte membrane, and the second benzoxazine-based monomer is preferably used as an additive when the electrolyte membrane is formed.

In Formulae 1 and 2, R₂ preferably is a phenyl group, —CH₂—CH=CH₂, or a group represented by the following formulae.

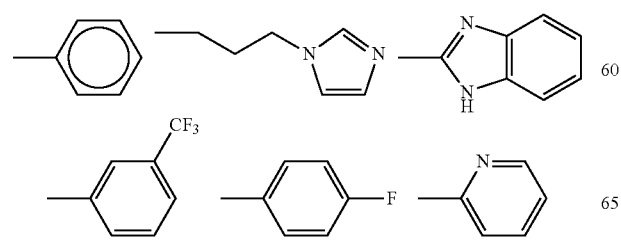

In Formula 2, R₃ preferably is —C(CH₃)₂—, —C(CF₃)₂—, —C(=O)—, —SO₂—, —CH₂—, —C(CCl₃)—, —CH(CH₃)—, or —CH(CF₃)—, so that the second benzoxazine-based monomer is a difunctional benzoxazine-based compound containing two benzoxazine rings.

According to another preferred embodiment of the invention, R₃ is a group represented by the formula below, so that the second benzoxazine-based monomer is a trifunctional benzoxazine-based compound containing three benzoxazine rings.

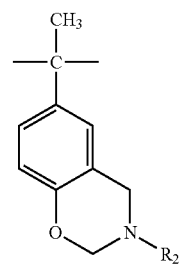

Particularly preferred examples of the first benzoxazine-based monomer of Formula 1 comprise the compounds represented by Formulae 5 to 15 below.

Formula 5

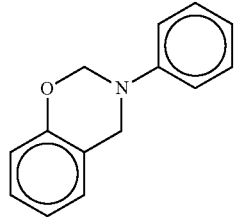

Formula 6

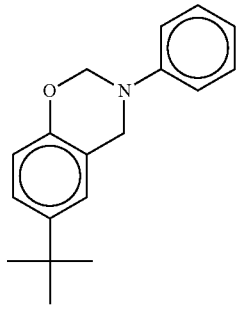

Formula 7

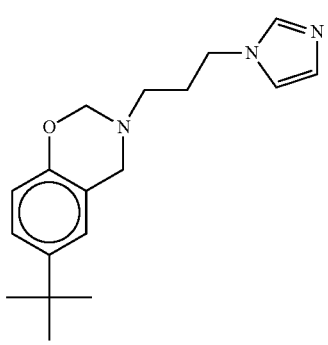

Formula 8
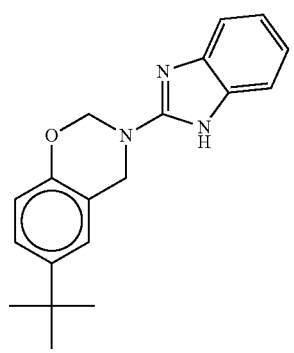
Formula 9
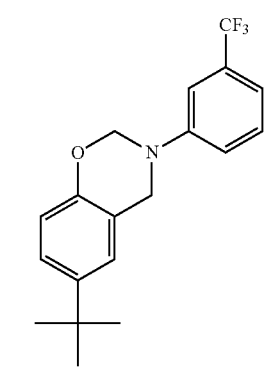
Formula 10
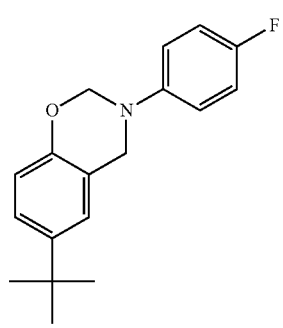
Formula 11
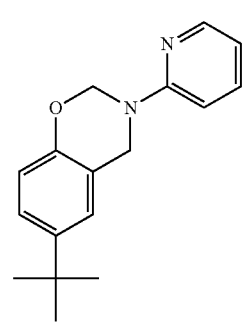
Formula 12
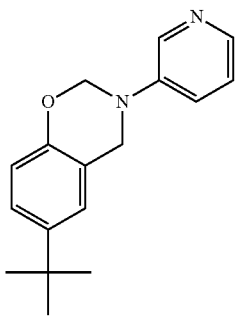
Formula 13
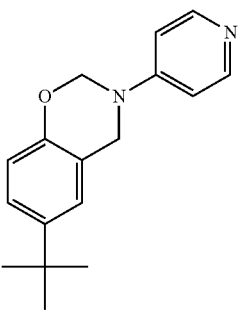
Formula 14
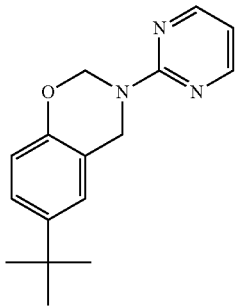
Formula 15
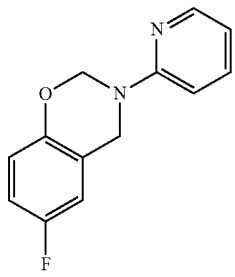
Particularly preferred examples of the second benzoxazine-based monomer of Formula 2 include the compounds represented by Formulae 16 to 20 below.
Formula 16
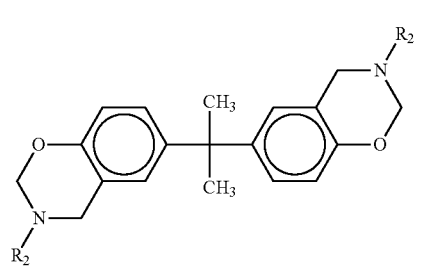

Formula 17
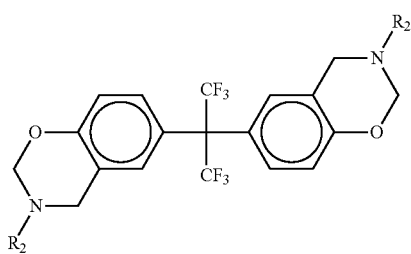

Formula 18
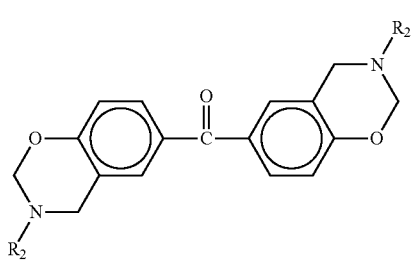

Formula 19
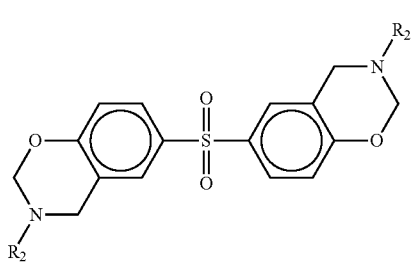

Formula 20
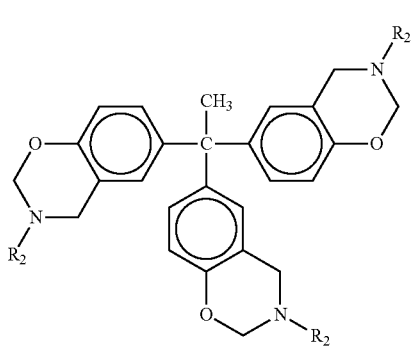

wherein $R_2$ is a phenyl group, —$CH_2$—$CH$=$CH_2$, or a group represented by the following formulae.

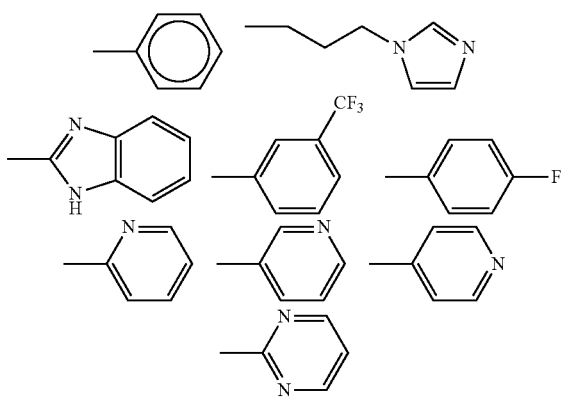

The amount of the second benzoxazine-based monomer is preferably selected in the range of 0.5 to 50 parts by weight, and more preferably 1 to 10 parts by weight, based on 100 parts by weight of the first benzoxazine-based monomer.

Further details regarding polybenzoxazine-based compounds of that kind are described in US 2009/0042093 A1, and EP 2 048 183 A1.

Further particularly suitable benzoxazine-based compounds are represented by Formula 1 below.

Formula 1
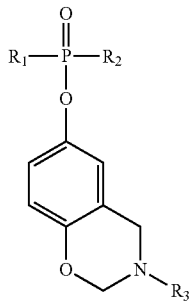

wherein $R_1$ and $R_2$ are each independently a C1-C20 alkyl group, a $C_1$-$C_{20}$ alkoxy group, a $C_6$-$C_{20}$ aryl group, a $C_6$-$C_{20}$ aryloxy group or a group represented by the formula below,

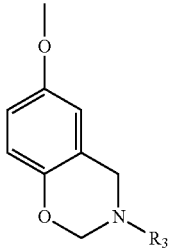

wherein $R_3$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated C1-C20 heteroaryloxy group, a $C_4$-$C_{20}$ cycloalkyl group, a halogenated $C_4$-$C_{20}$ cycloalkyl group, a $C_1$-$C_{20}$ heterocyclic group or a halogenated $C_1$-$C_{20}$ heterocyclic group.

A group of preferred phosphorous containing benzoxazine-based monomers comprises compounds represented by Formulae 2 to 4.

Formula 2
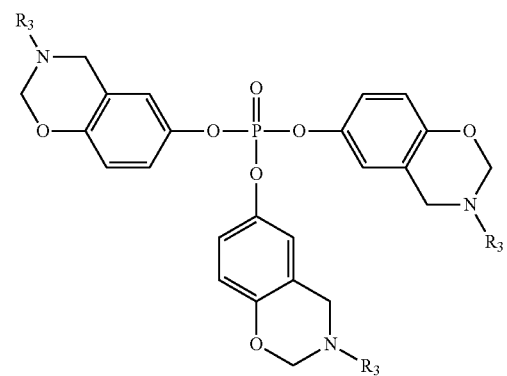

Formula 3

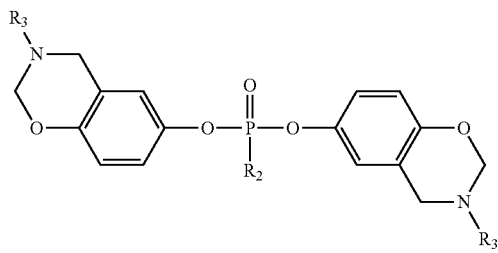

wherein $R_2$ is a $C_1$-$C_{10}$ alkyl group, a $C_1$-$C_{10}$ alkoxy group, a $C_6$-$C_{10}$ aryl group or a $C_6$-$C_{10}$ aryloxy group, and Formula 4

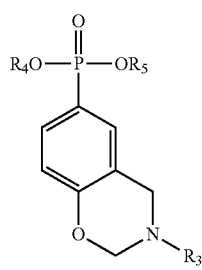

wherein $R_4$ and $R_5$ are a $C_6$-$C_{10}$ aryl group, $R_3$ of Formulae 2 to 4 is selected from the groups represented by the formulae below.

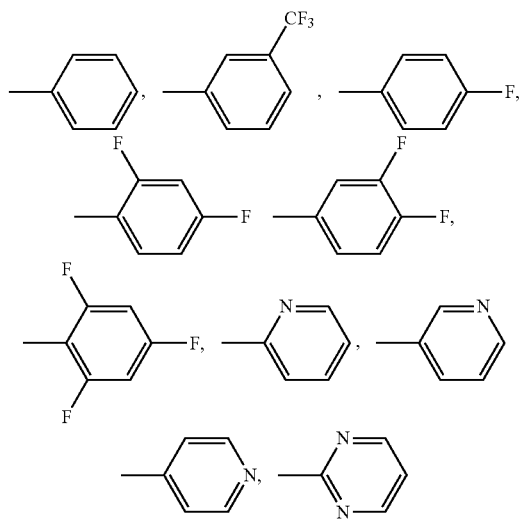

In Formulae 2 to 4, when $R_3$ is a phenyl group substituted with fluorine.

Preferably, the compound of Formula 3 is a compound represented by Formulae 5 or 6.

Formula 5

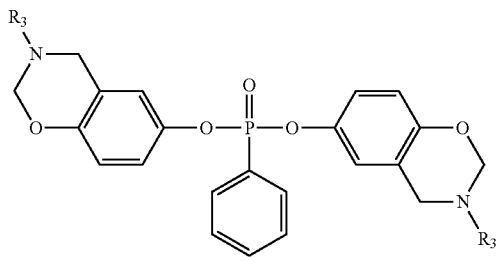

Formula 6

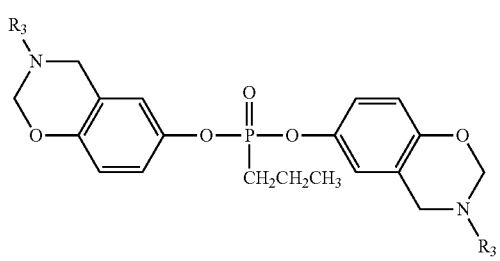

Here, $R_3$ of Formulae 5 and 6 is selected from the groups represented by the formulae below.

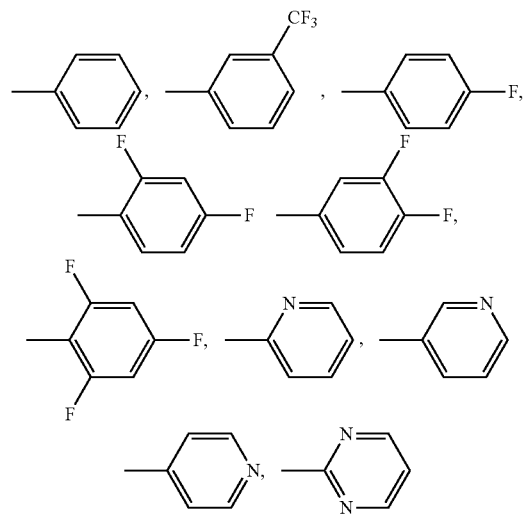

Preferably, the compound represented by Formula 4 is a compound represented by Formula 7.

Formula 7

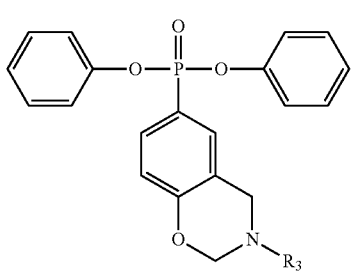

$R_3$ is preferably selected from the groups represented by the formulae below.

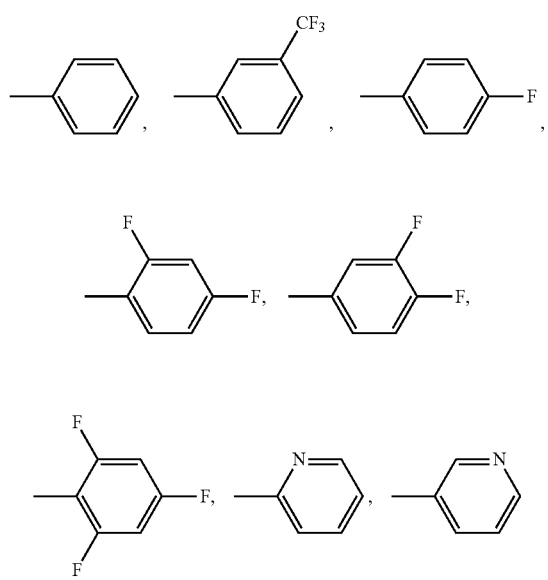
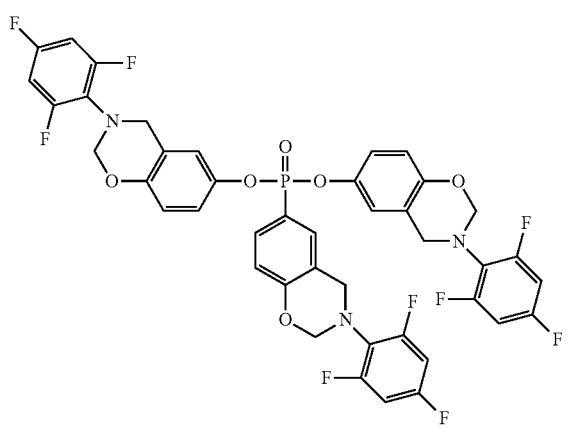
Formula 10
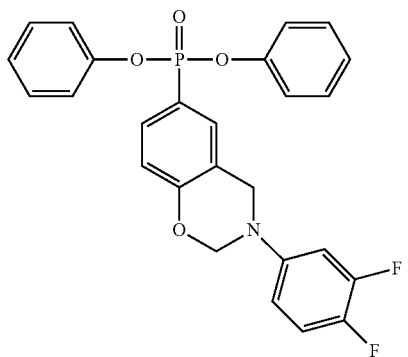
Formula 11
Particularly preferred examples of the phosphorous containing benzoxazine-based monomer include compounds represented by Formulae 8 to 14.
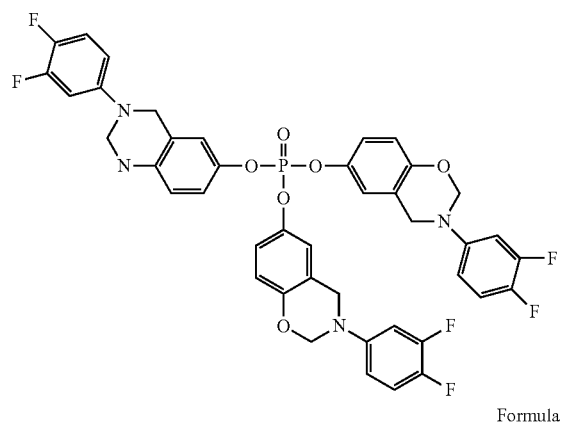
Formula 8
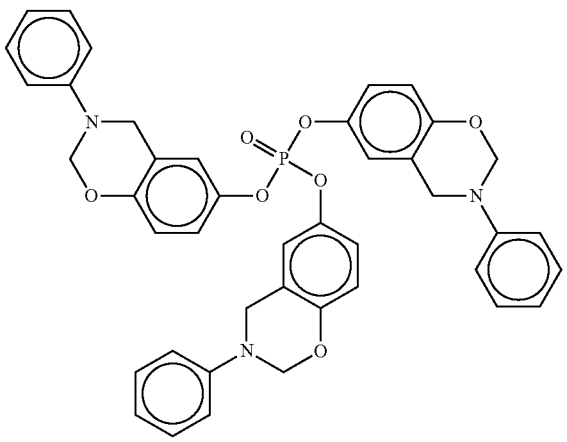
Formula 12
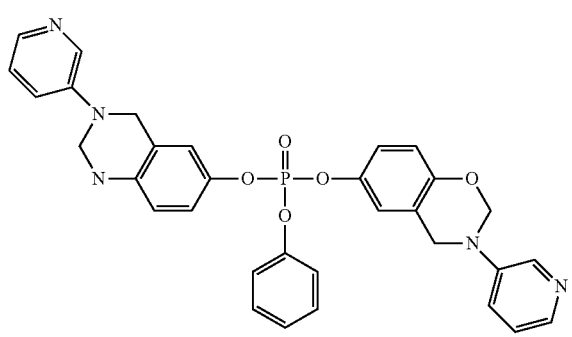
Formula 9
Formula 13

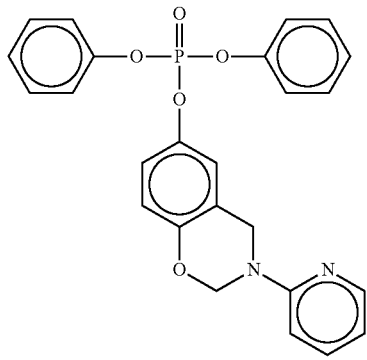

Formula 14

Hereinafter, a method of preparing a phosphorous containing benzoxazine-based monomer represented by Formula 1 according to this embodiment of the present invention will be described. For example, compounds represented by Formulae 2, 5-7 are described, but it is to be understood that other compounds can be synthesized in a similar manner.

Referring to Reaction Scheme 1 below, phosphorous containing benzoxazine-based monomers represented by Formulae 2, 5-7 can be prepared by heating a mixture of a phosphorous containing phenol-based compound, an amine compound and p-formaldehyde, with or without a solvent, refluxing the mixture, and performing a work-up process of the resultant.

Reaction Scheme 1

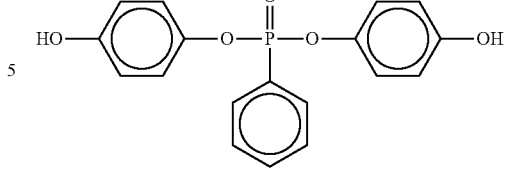

$4CH_2O + 2H_2NR_3 \longrightarrow$

Formula 5

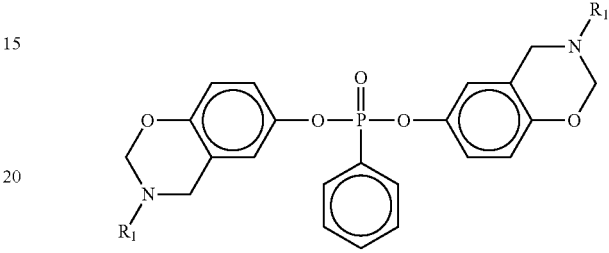

$4CH_2O + 2H_2NR_3 \longrightarrow$

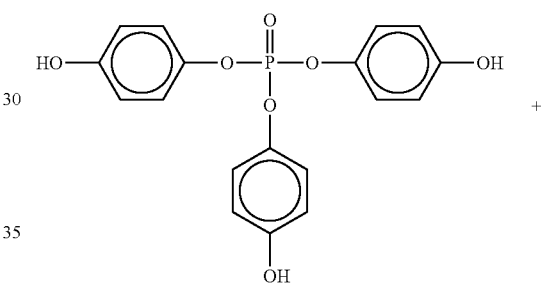

Formula 6

$6CH_2O + 3H_2NR_3 \longrightarrow$

Formula 2

$2CH_2O + H_2NR_3 \longrightarrow$

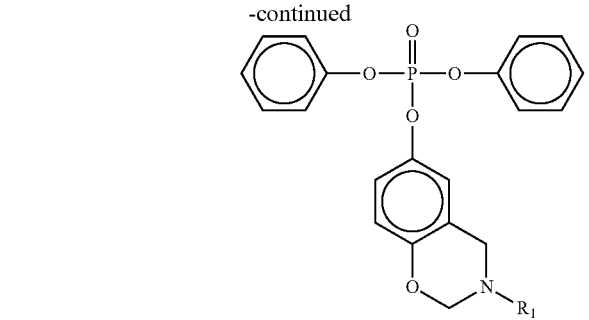

Here, R$_3$ of Reaction Scheme 1 is preferably selected from the groups represented by the formulae below as defined in Formulae 2, 5-7.

Preferred solvents include 1,4-dioxane, chloroform, dichloromethane, THF. Preferred heating temperatures are in the range of 50 to 90° C. Most preferably, the solvent is adjusted to a temperature at which it is refluxed.

The phosphorous containing phenol-based compound used in Reaction Scheme 1 can be prepared by using 4-benzyloxyphenol and phosphoryl chloride by a protection reaction and deprotection reaction using esterification and hydrogenation as shown in Reaction Scheme 2.

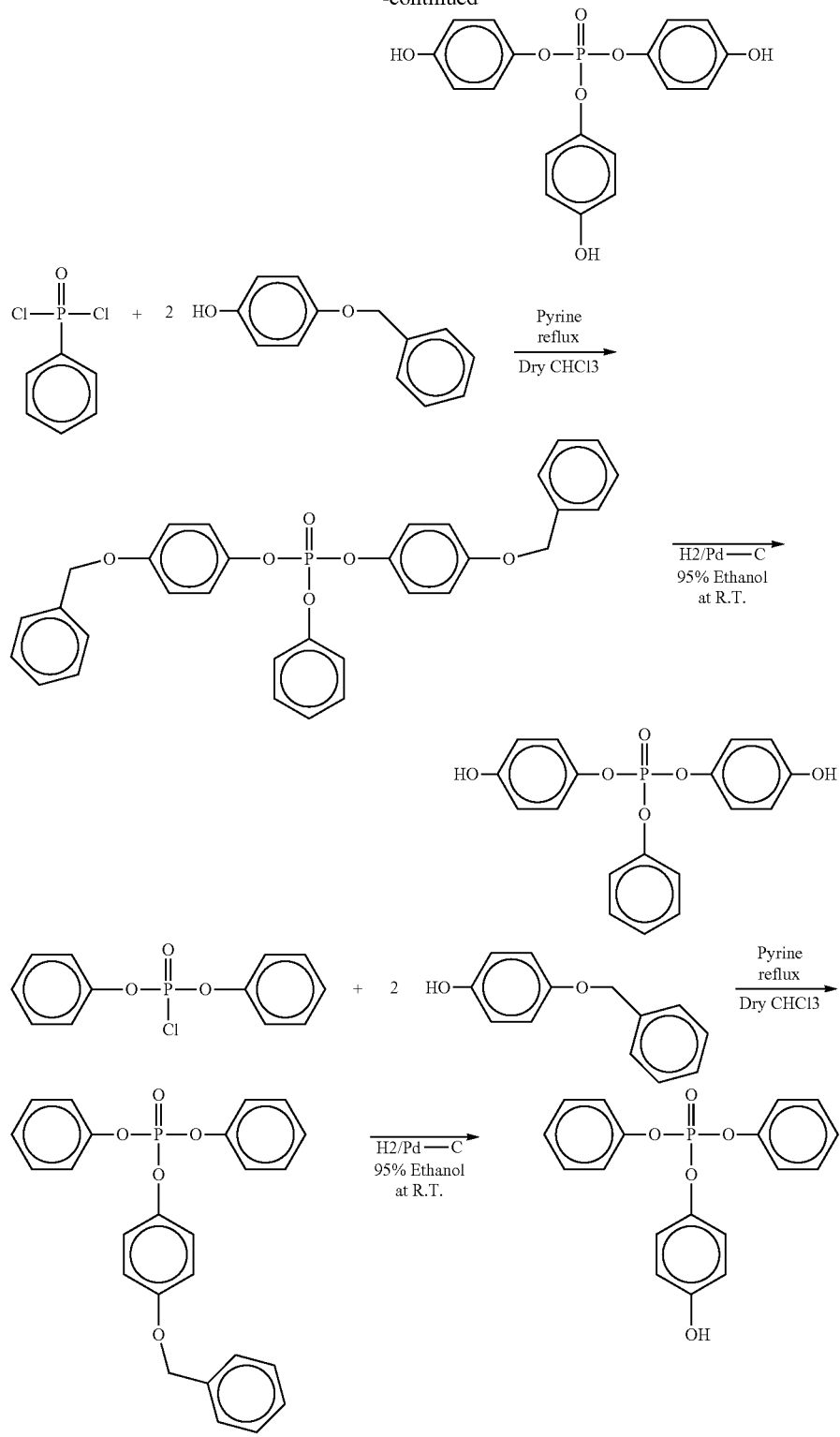

The esterification is preferably performed under reflux conditions in the presence of a base such as pyridine and triethylamine as shown in Reaction Scheme 1, but the esterification conditions are not limited thereto.

The hydrogenation is preferably carried out at room temperature (20-25° C.) in the presence of hydrogen and a catalyst such as Pd/C as shown in Reaction Scheme 1, but the hydrogenation conditions are not limited thereto.

According to an embodiment of the present invention, a polymer of a phosphorous containing benzoxazine-based monomer represented by Formula 1 is used.

The polymer is preferably prepared by dissolving the benzoxazine-based monomer in a solvent and polymerizing the solution by heat-treatment. The heat-treatment is preferably carried out in the range of 180 to 250° C. When the heat-treatment temperature is less than 180° C., the reactivity of the polymerization may be decreased. On the other hand, when the temperature is higher than 250° C., by-products generated from side reactions may decrease the yield. A polymerization catalyst can be used, if desired.

Preferred solvents comprise N-methylpyrrolidone (NMP), and dimethyl acetamide (DMAc), and the amount of the solvent is preferably selected within the range of 0.05 to 65 parts by weight based on 100 parts by weight of benzoxazine-based monomer. If the amount of the solvent is less than 0.05 parts by weight, stiffness of the membrane may not be sufficient. On the other hand, if the amount of the solvent is greater than 65 parts by weight, membrane forming properties may be decreased.

Further details regarding polybenzoxazine-based compounds of that kind are described in US 2009/0068543 A1.

A preferred embodiment of the present invention uses a benzoxazine-based monomer represented by Formula 1.

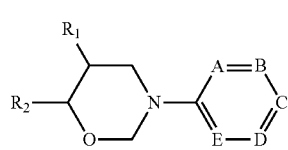

Formula 1

Here, A, B, C, D and E are carbon, or one or two of A, B, C, D and E is nitrogen and the others are carbon, and $R_1$ and $R_2$ are connected to each other to form a ring, wherein the ring is a $C_6$-$C_{10}$ cycloalkyl group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group.

The ring formed by $R_1$ and $R_2$ in Formula 1 is preferably represented by the formulae below.

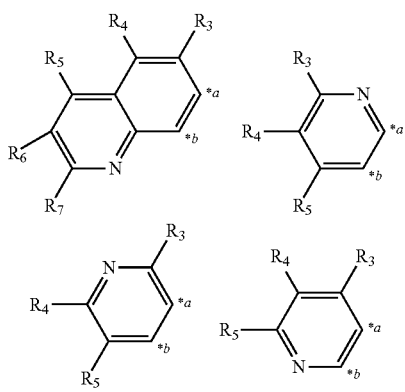

Here, $R_3$ to $R_7$ are each independently a hydrogen atom, a $C_1$-$C_{10}$ alkyl group, a $C_6$-$C_{10}$ aryl group, a halogen atom, a cyano group, a hydroxyl group, a $C_6$-$C_{10}$ cycloalkyl group, a $C_1$-$C_{10}$ heteroaryl group or a $C_1$-$C_{10}$ heterocyclic group, wherein the *a is connected to $R_1$ of Formula 1 and the *b is connected to $R_2$ of Formula 1.

The

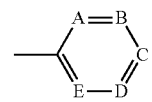

of Formula 1 is preferably represented by the formulae below.

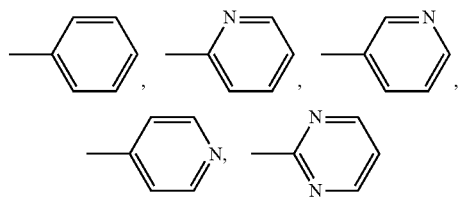

The benzoxazine-based monomer according to this embodiment of the present invention has a structure capable of improving affinity for an acid. According to an embodiment of the present invention, when the benzoxazine-based monomer represented by Formula 10 is added to an electrode for a fuel cell, the benzoxazine-based monomer of Formula 10 is transformed to a structure having a plurality of tertiary amines by ring opening polymerization while the fuel cell is operating and thus traps an acid as shown in Reaction Scheme 1.

Reaction Scheme 1

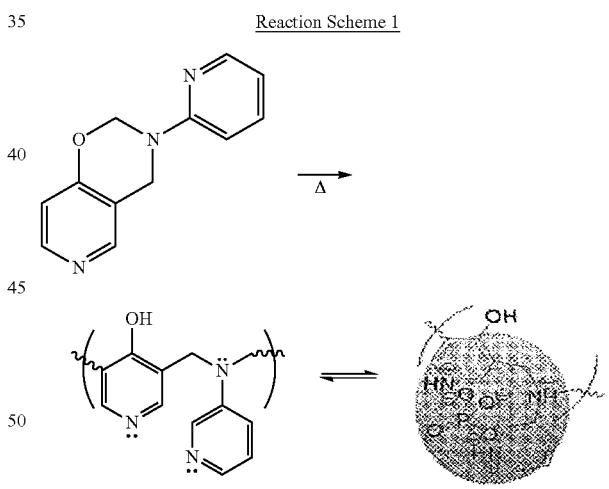

Preferred benzoxazine-based monomers comprise one of the compounds represented by Formulae 1A to 1D.

Formula 1A

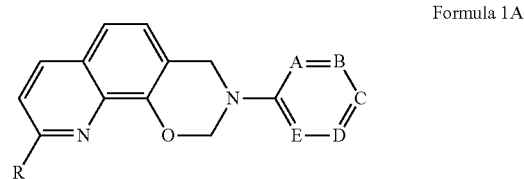

Here, R is a hydrogen atom or a $C_1$-$C_{10}$ alkyl group.

Formula 1B

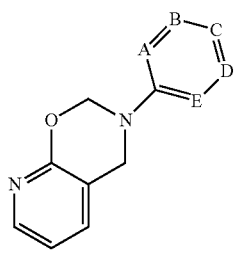

Formula 1C

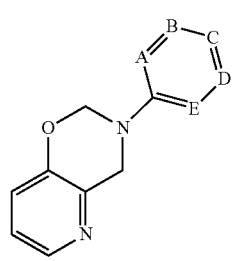

Formula 1D

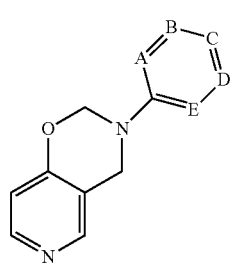

Here, the

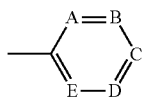

of Formulae 1A to 1D is preferably represented by the formulae below.

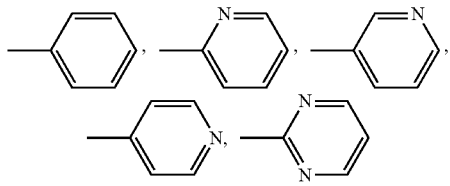

The benzoxazine-based monomer represented by Formula 1 can be synthesized using a phenol compound having a pyridine or pyridine derivative as a starting material, an amine compound and p-formaldehyde. The conditions for the reaction are not limited. For example, the reaction can be performed by a melt process without a solvent at a temperature in the range of 80 to 100° C., and the temperature may vary according to the types of substituents.

Hereinafter, a method of preparing the benzoxazine-based monomer represented by Formula 1 will be described. For example, compounds represented by Formulae 1A and 1B are described, but other compounds can be synthesized in a similar manner.

First, the benzoxazine-based monomers represented by Formulae 1A and Formula 1B can be prepared by heating a mixture of 8-hydroxyquinoline (A), p-formaldehyde (B) and an amine compound (C) without a solvent, or can be prepared by adding a solvent to the mixture, refluxing the mixture, and performing a work-up process of the resultant as shown in Reaction Scheme 2.

Reaction Scheme 2

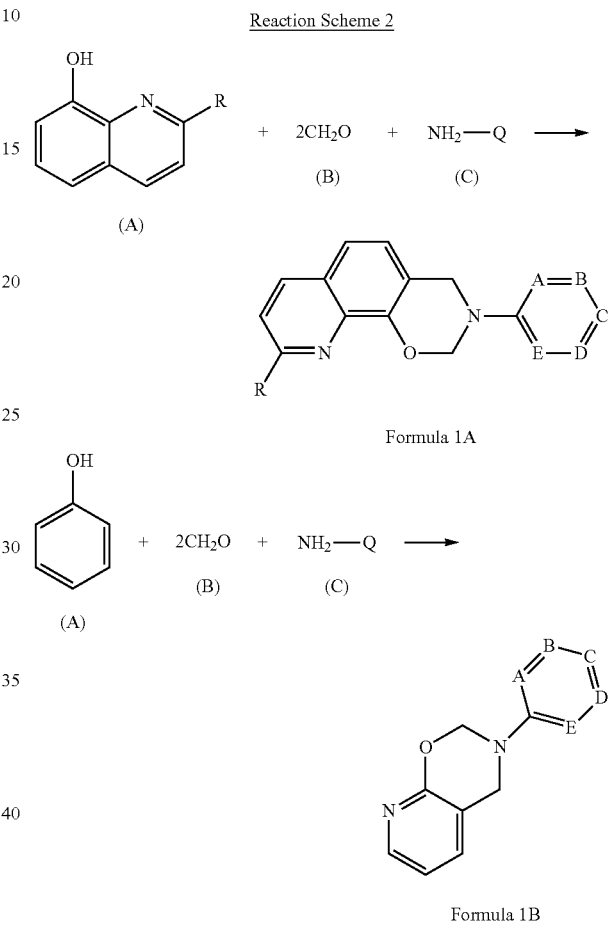

Here, R is a hydrogen atom or a $C_1$-$C_{10}$ alkyl group, and -Q is

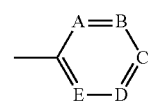

which preferably is one of the formulae below.

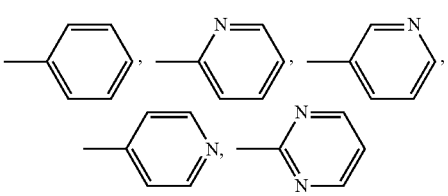

When a solvent is used, 1,4-dioxane, chloroform, dichloromethane, or THF are favourably used as the solvent. Preferred heating temperatures are within the range of 50 to 90°

C. and preferably about 80° C. Most preferably, the temperature is adjusted to a temperature at which the solvent is refluxed.
Preferred benzoxazine-based monomers comprise compounds represented by Formulae 2 to 21.
Formula 2
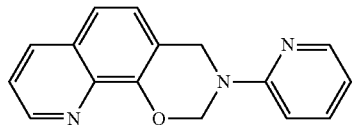
Formula 3
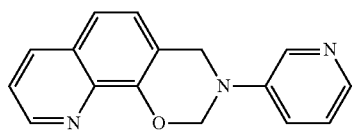
Formula 4
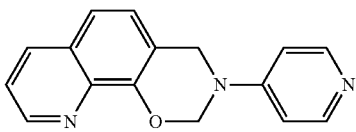
Formula 5
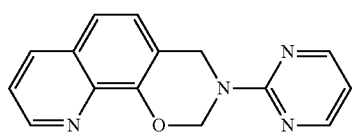
Formula 6
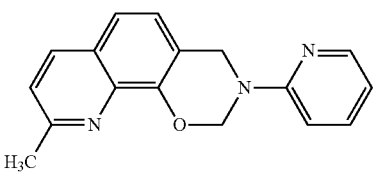
Formula 7
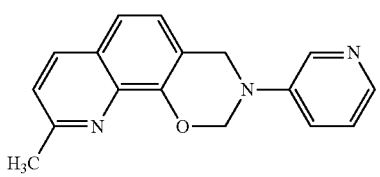
Formula 8
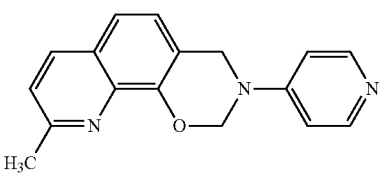
Formula 9
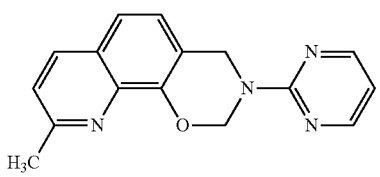
Formula 10
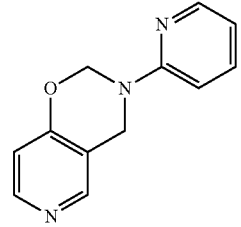
Formula 11
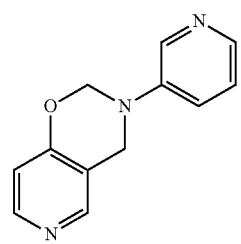
Formula 12
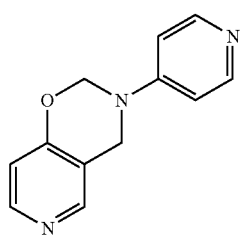
Formula 13
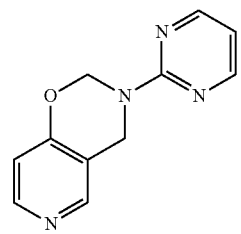
Formula 14
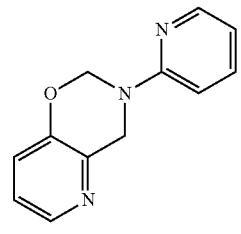
Formula 15
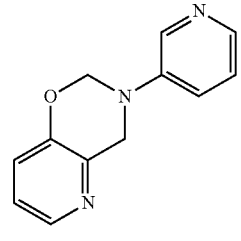

-continued

Formula 16
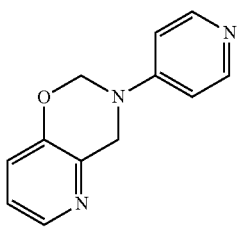

Formula 17
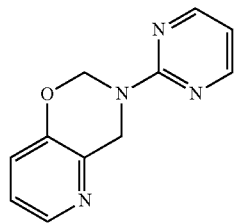

Formula 18
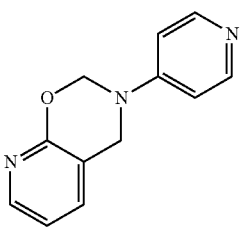

Formula 19
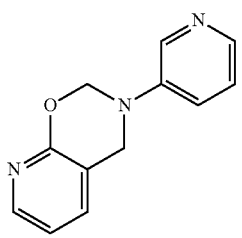

Formula 20
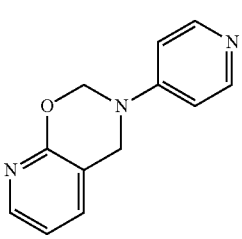

Formula 21
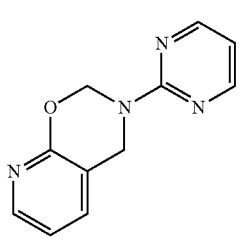

A benzoxazine-based monomer according to this embodiment of the present invention has good affinity for an acid, high thermal resistance and high phosphoric acid resistance. When used in the preparation of an electrode and an electrolyte membrane for a fuel cell, the benzoxazine-based monomer can have a tertiary amine structure in which a backbone of a main chain has affinity to phosphoric acid by ring-opening polymerization. Thus, affinity for phosphoric acid is increased to maximize the capacity of phosphoric acid. Therefore, the fuel cells employing the electrolyte membrane including the benzoxazine-based monomer can have excellent usability, high conductivity, and long lifetime, and can operate at a high temperature with no humidity, and can have excellent power generation efficiency.

For the purposes of the present invention, it is also advantageous to use a polymer of the benzoxazine-based monomer represented by Formula 1.

The polymer can be prepared by dissolving the benzoxazine-based monomer in a solvent and polymerizing the solution by heat-treatment. The heat-treatment may be performed at a temperature in the range of 150 to 240° C. When the heat-treatment temperature is less than 150° C., reactivity of polymerization may be decreased. On the other hand, when the temperature is higher than 240° C., by-products generated by side reactions may decrease the yield.

A polymerization catalyst can be used, if required.

Preferred solvents comprise N-methylpyrrolidone (NMP), and dimethyl acetamide (DMAc), and the amount of the solvent is preferably selected within the range of 5 to 95 parts by weight based on 100 parts by weight of benzoxazine-based monomer.

Further details regarding polybenzoxazine-based compounds of that kind are described in EP 2 036 910 A1.

In the present invention, the use of a first benzoxazine-based monomer represented by Formula 1 below and/or a second benzoxazine-based monomer represented by Formula 2 below is also preferred.

Formula 1
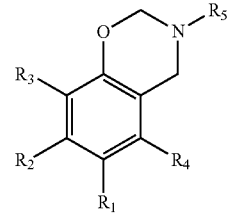

Formula 2
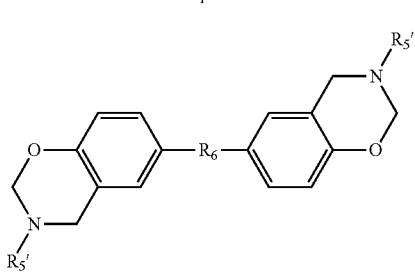

wherein $R_1$ to $R_4$ are each independently hydrogen, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ cycloalkyl group, a substituted or unsubstituted $C_4$-$C_{20}$ cycloalkyloxy group, a substituted or unsubstituted $C_2$-$C_{20}$ heterocycle group, a halogen atom, a hydroxyl group, or a cyano group.

$R_5$ is a halogenated $C_1$-$C_{20}$ alkyl group, a halogenated $C_1$-$C_{20}$ alkoxy group, a halogenated $C_2$-$C_{20}$ alkenyl group, a halogenated $C_2$-$C_{20}$ alkynyl group, a halogenated $C_6$-$C_{20}$ aryl group, a halogenated $C_6$-$C_{20}$ aryloxy group, a halogenated $C_7$-$C_{20}$ arylalkyl group, a halogenated $C_2$-$C_{20}$ heteroaryl group, a halogenated $C_2$-$C_{20}$ heteroaryloxy group, a halogenated $C_2$-$C_{20}$ heteroarylalkyl group, a halogenated $C_4$-$C_{20}$ carbocycle group, a halogenated $C_4$-$C_{20}$ carbocyclicalkyl group, a halogenated $C_2$-$C_{20}$ heterocycle group, or a halogenated $C_2$-$C_{20}$ heterocyclicalkyl group.

$R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocycle group, a substituted or unsubstituted $C_4$-$C_{20}$ carbocyclicalkyl group, a substituted or unsubstituted $C_2$-$C_{20}$ heterocycle group, or a substituted or unsubstituted $C_2$-$C_{20}$ heterocyclicalkyl group.

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—.

Preferably, at least one of $R_5'$ and $R_6$ is a halogenated substituent.

The electrolyte membrane obtainable by this way reduces problems observed when an electrolyte membrane formed of polybenzimidazole alone is used, such as, a pinhole phenomenon caused by mechanical and chemical instability at high temperature of the electrolyte membrane including only polybenzimidazole.

In Formula 1, $R_5$ is preferably selected from the group of compounds represented by following formulae:

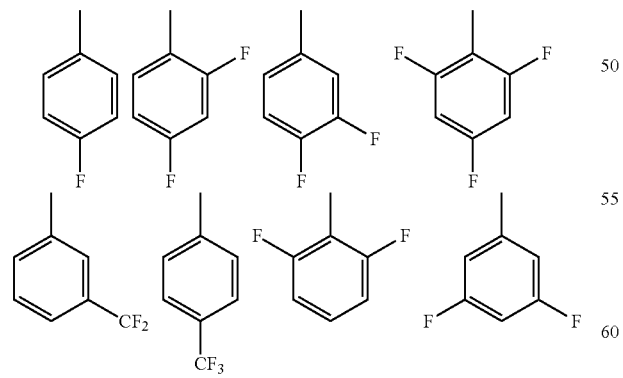

In Formula 1, it is preferred that $R_1$ to $R_4$ are each independently hydrogen, F, a C1-C10 alkyl group, an allyl group, or a $C_6$-$C_{10}$ aryl group. In addition, in Formula 2, it is preferred that $R_6$ is —C(CF$_3$)$_2$—, SO$_2$—, or —C(CH$_3$)$_2$—, and that $R_5'$ is a phenyl group, or one of the same groups as the fluorinated functional groups of $R_5$ described above represented by the following formulae:

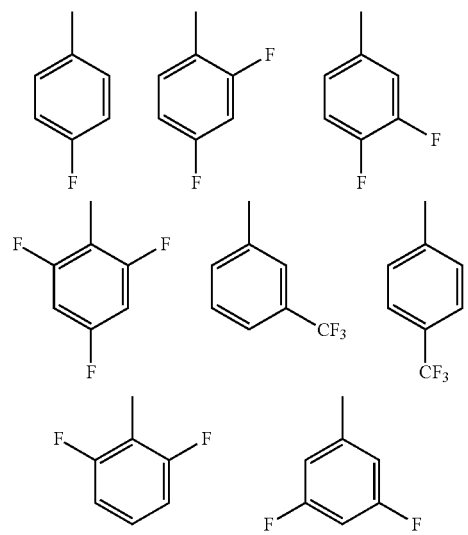

In Formula 2, it is preferred that at least one of $R_5'$ and $R_6$ is a halogenated substituent, preferably a fluorinated substituent.

The first benzoxazine-based monomer of Formula 1 preferably is a compound represented by Formula 3 or 4 below.

Formula 3

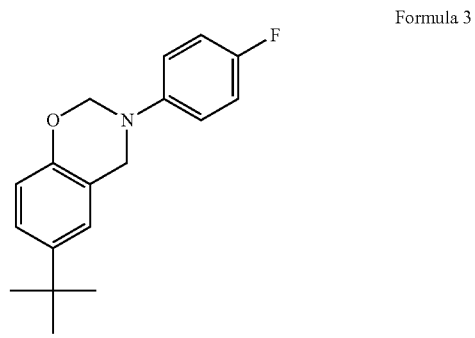

Formula 4

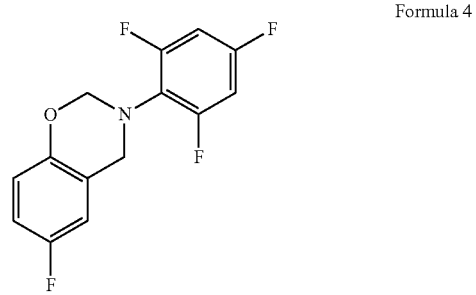

The second benzoxazine-based monomer of Formula 2 preferably is a compound represented by Formula 5 below.

Formula 5

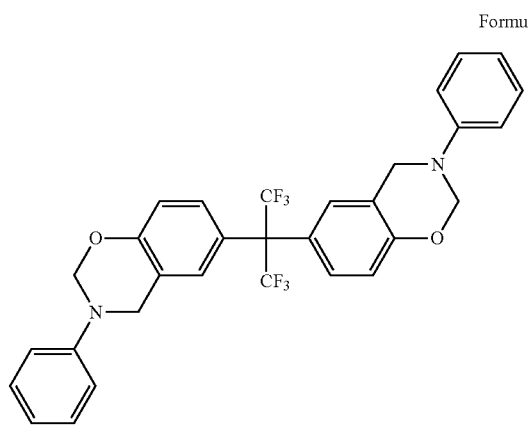

Further details regarding polybenzoxazine-based compounds of that kind are described in EP 2 056 390 A1.

For the purposes of the present invention, the use of a phosphorous containing monomer represented by Formula 1 below is also preferred.

Formula 1

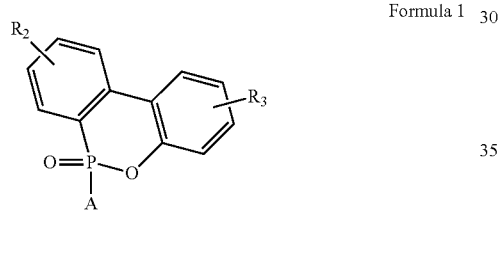

wherein A is a substituted or unsubstituted $C_1$-$C_{20}$ heterocycle group, a substituted or unsubstituted $C_4$-$C_{20}$ cycloalkyl group, or a substituted or unsubstituted $C_1$-$C_{20}$ alkyl group, and $R_2$ and $R_3$ are each independently hydrogen, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocycle group, a halogen atom, a cyano group, or a hydroxyl group.

Thereby, the monomer comprises at least one oxazine moiety.

Preferably, A is one of the groups represented by the following formulae:

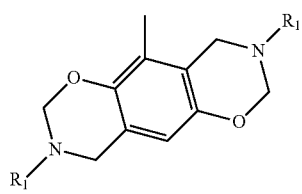

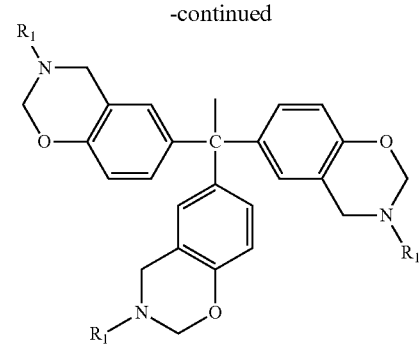

wherein $R_1$ is hydrogen, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ cycloalkyl group, a halogenated $C_4$-$C_{20}$ cycloalkyl group, a $C_1$-$C_{20}$ heterocycle group, or a halogenated $C_1$-$C_{20}$ heterocycle group.

Preferred phosphorous containing monomers also comprise compounds represented by Formulae 2 and 3 below:

Formula 2

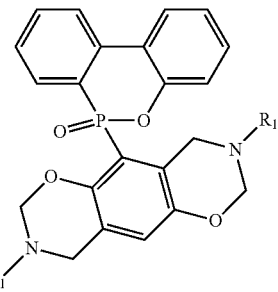

Formula 3

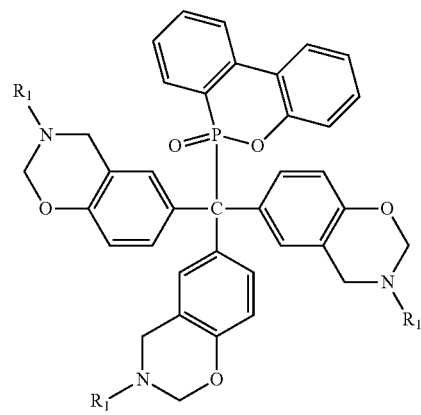

wherein $R_1$ is one selected from groups represented by the following formulae.

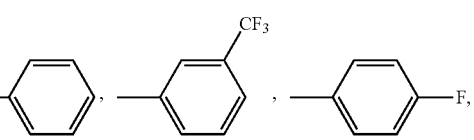

-continued
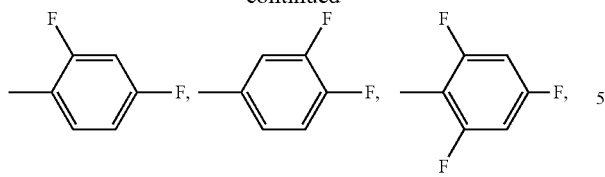
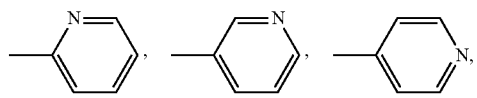
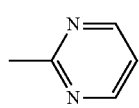
The phosphorous containing monomer according to this embodiment has excellent thermal stability and capability of retaining phosphoric acid.
Preferred examples of the compound represented by Formula 2 or 3 include compounds represented by Formulae 4 to 10 below.
Formula 4
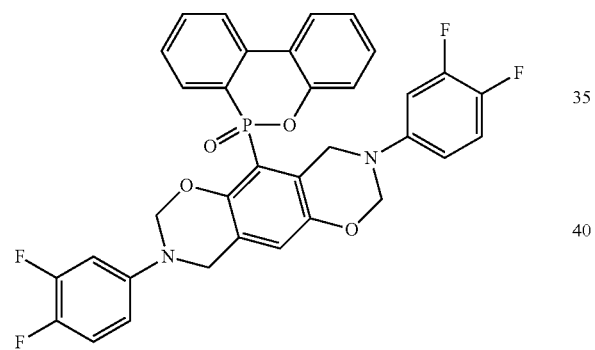
Formula 5
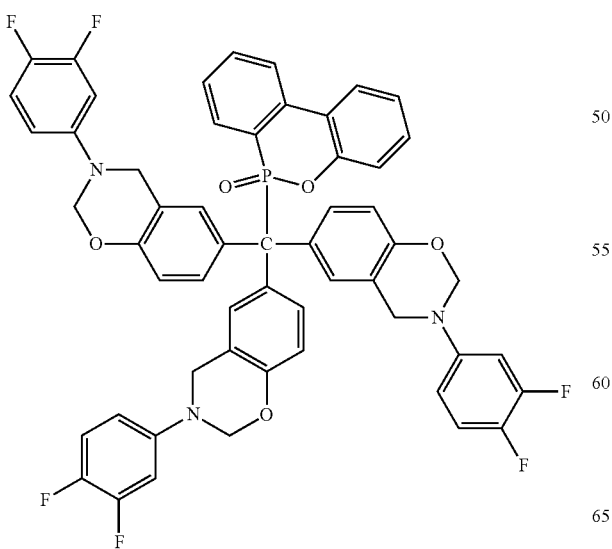
-continued
Formula 6
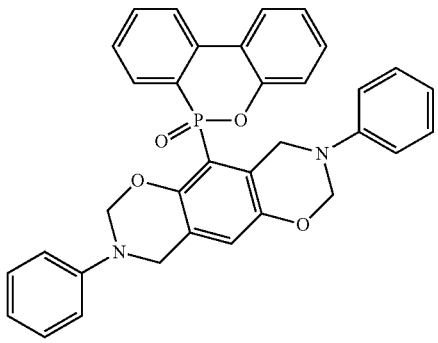
Formula 7
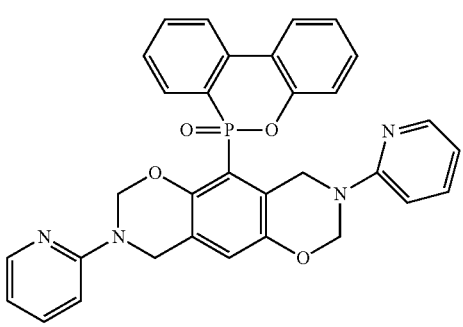
Formula 8
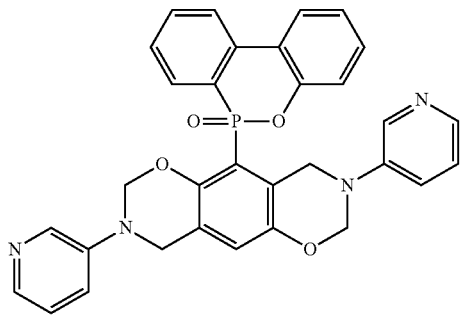
Formula 9
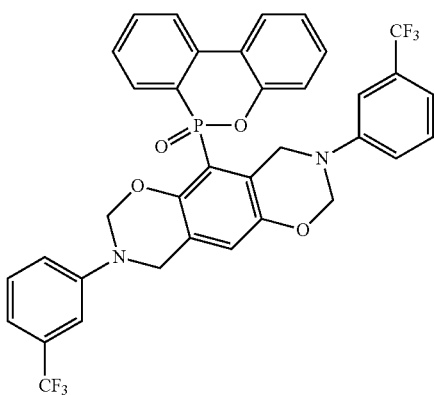

Formula 10

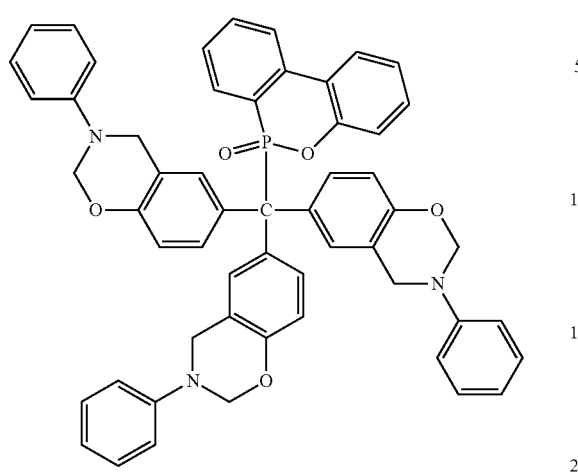

Hereinafter, a method of preparing the phosphorous containing monomer of Formula 1 according to this embodiment of the present invention will be described. As an embodiment of the present invention, a method of preparing the compound represented by Formula 2 or 3 will now be described; however, the other compounds described above can be synthesized in a manner similar to the preparation method according to the current embodiment of the present invention.

Referring to Reaction Schemes 1 and 2 below, the compound of Formula 2 can be prepared by heating DOPO-containing diol (A), p-formaldehyde (B) and an amine compound (C) without a solvent or adding a solvent to A, B and C and then refluxing the mixture, and thereafter working up the resultant. The compound of Formula 3 may be prepared in the same manner as in Reaction Scheme 1, except that DOPO-containing triol (A') is used instead of DOPO-containing diol (A).

Reaction Scheme 1

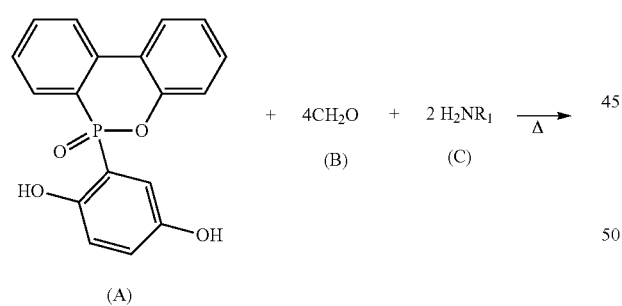

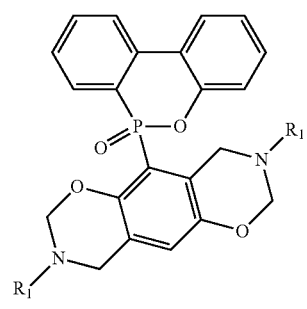

Formula 2

Reaction Scheme 2

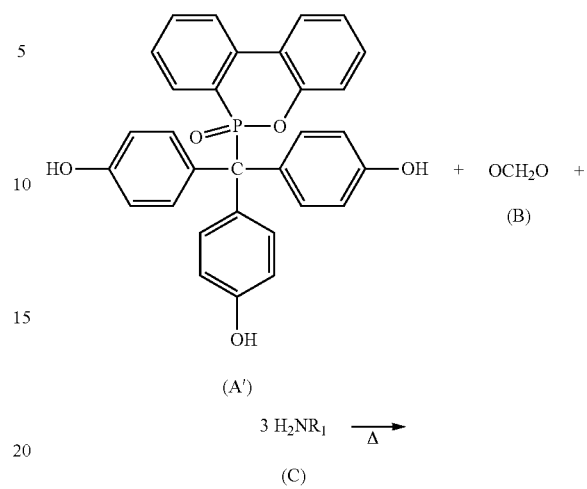

Formula 3

In Reaction Schemes 1 and 2, $R_1$ is selected from the same groups represented by the following formulae as defined in Formulae 2 or 3.

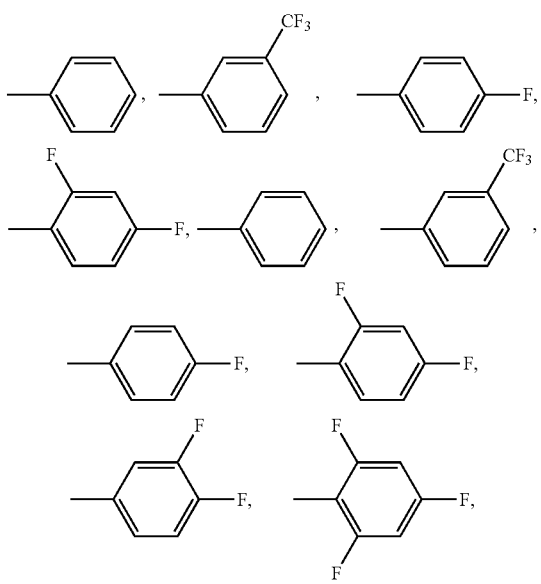

The solvent used in the reaction described above may be 1,4-dioxane, chloroform, dichloromethane, THF. The heating temperature is preferably adjusted to a temperature at which the solvent can be refluxed, preferably in a range of 80 to 120° C., and in particular to a temperature of about 110° C.

As a non-limited embodiment of the working-up process, the resultant reaction mixture is washed with an aqueous 1N NaOH solution and water and dried using a drying agent such as magnesium sulfate, and then the resultant is filtered and evaporated under reduced pressure in order to remove the solvent from the resultant, and dried to obtain a target material.

DOPO-containing diol (A) used in Reaction Scheme 1 can be prepared by reacting DOPO and p-benzoquinone as shown in Reaction Scheme 3 below.

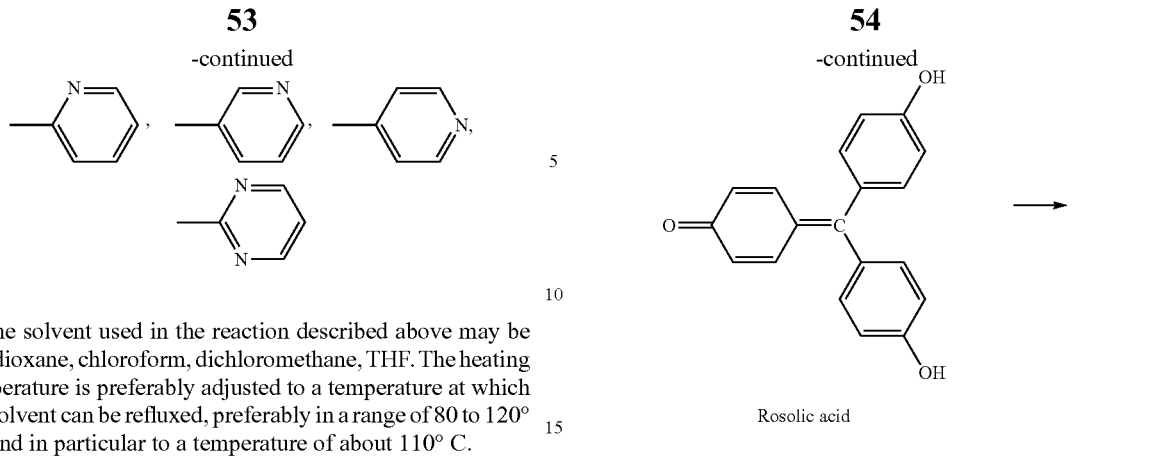

In addition, DOPO-containing triol (A') can be prepared by reacting DOPO and rosolic acid as shown in Reaction Scheme 4 below.

Conditions of the reactions of Reaction Schemes 3 and 4 are not particularly limited. However, in the case of Reaction Scheme 3, DOPO-containing diol (A) is synthesized by reacting DOPO and p-benzoquinone at 125° C. for 4 hours using 2-ethoxyethanol as a solvent, and in the case of Reaction Scheme 4, the reaction is performed under solvent reflux. For example, the reaction may be performed at 90° C. for at least 24 hours when ethanol is used as a solvent.

Further details regarding polybenzoxazine-based compounds of that kind are described in EP 2 058 321A1.

In the present invention, the use of a naphthoxazine benzoxazine-based monomer represented by Formula 1 below and/or a polymer thereof is also preferred.

wherein $R_2$ and $R_3$ or $R_3$ and $R_4$ are linked to each other to form a group represented by Formula 2 below, $R_5$ and $R_6$ or $R_6$ and $R_7$ are linked to each other to form a group represented by Formula 2 below, and

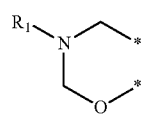

Formula 2

R$_1$ is a substituted or unsubstituted C$_1$-C$_{20}$ alkyl group, a substituted or unsubstituted C$_1$-C$_{20}$ alkoxy group, a substituted or unsubstituted C$_2$-C$_{20}$ alkenyl group, a substituted or unsubstituted C$_2$-C$_{20}$ alkynyl group, a substituted or unsubstituted C$_6$-C$_{20}$ aryl group, a substituted or unsubstituted C$_6$-C$_{20}$ aryloxy group, a substituted or unsubstituted C$_7$-C$_{20}$ arylalkyl group, a substituted or unsubstituted C$_2$-C$_{20}$ heteroaryl group, a substituted or unsubstituted C$_2$-C$_{20}$ heteroaryloxy group, a substituted or unsubstituted C$_2$-C$_{20}$ heteroarylalkyl group, a substituted or unsubstituted C$_4$-C$_{20}$ carbocycle group, a substituted or unsubstituted C4-C20 carbocyclic alkyl group, a substituted or unsubstituted C$_2$-C$_{20}$ heterocycle group, or a substituted or unsubstituted C$_2$-C$_{20}$ heterocyclic alkyl group.

In Formula 2, * represents the bonding position of R$_2$ and R$_3$, R$_3$ and R$_4$, R$_5$ and R$_6$, or R$_6$ and R$_7$ of Formula 1.

R$_1$ is preferably selected from groups represented by the following formulae.

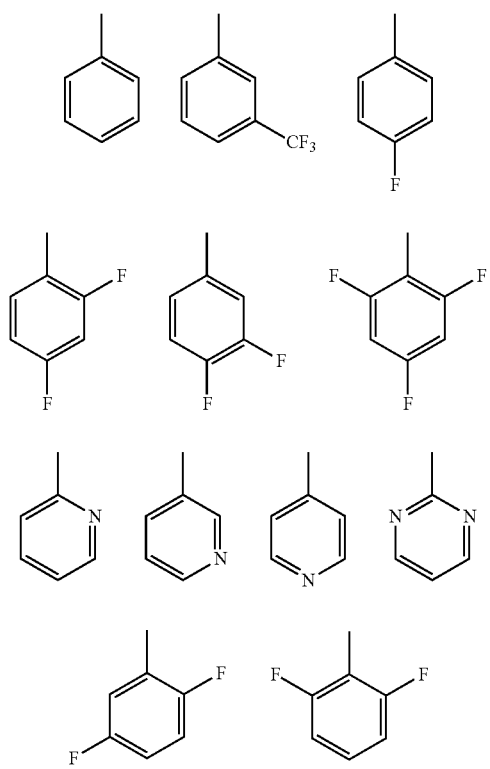

The naphthoxazine benzoxazine-based monomer is preferably at least one selected from compounds represented by Formulae 3 to 5.

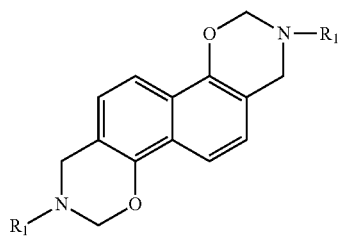

Formula 3

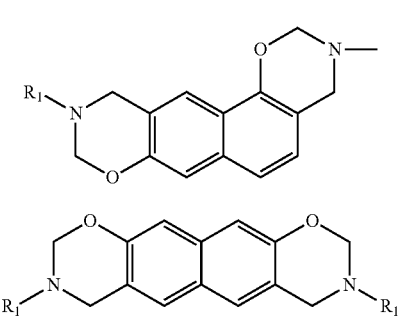

Formula 4

Formula 5

In Formulae 3 to 5, R$_1$ may be a group as defined in Formula 1, and is preferably selected from groups represented by the following formulae.

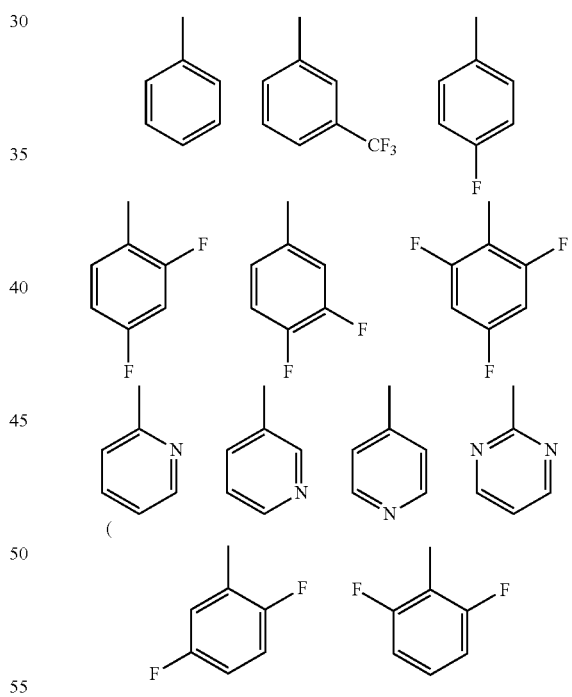

The naphthoxazine benzoxazine-based monomer according to this embodiment of the present invention includes a naphthoxazine group that can maximize a hydrogen bond in a molecule and a hydrogen bond between molecules. Thus, by using the naphthoxazine benzoxazine-based monomer, a fuel cell that can have excellent thermal stability and durability at an operating temperature, thereby having a long lifetime can be prepared.

The naphthoxazine benzoxazine-based monomer represented by Formula 1 is preferably selected from compounds represented by Formulae 6 to 11.

Formula 6

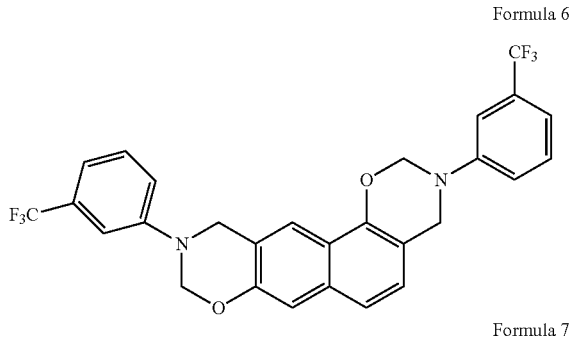

Formula 7

Formula 8

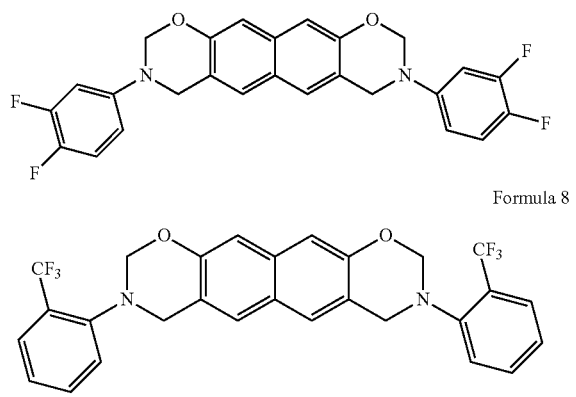

Formula 9

Formula 10

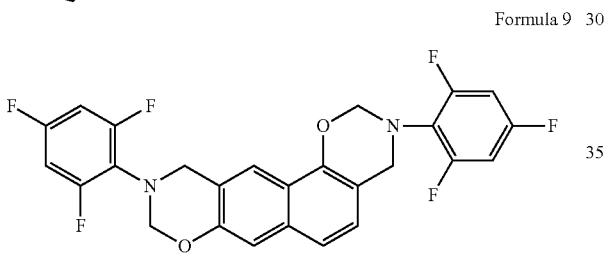

Formula 11 be described; however, the other compounds described above can be synthesized in a manner similar to the preparation method which is later to be described.

Referring to Reaction Schemes 1 to 3 below, the compound of Formula 3 can be prepared by heating 1,5-dihydroxynaphthalene (A), p-formaldehyde (B) and an amine compound (C) without a solvent or adding a solvent to A, B and C and then reflux the mixture, and thereafter working up the resultant. The compound of Formula 4 and the compound of Formula 5 can be prepared in the same manner as in Reaction Scheme 1, except that 1,6-dihydroxynaphthalene (A') and 2,7-dihydroxynaphthalene (A'') are used instead of 1,5-dihydroxynaphthalene (A).

Reaction Scheme 1

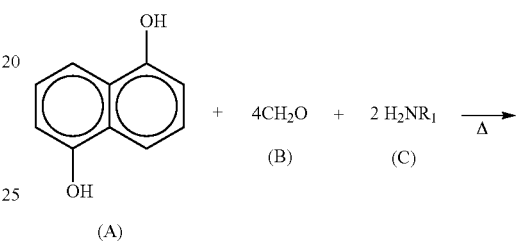

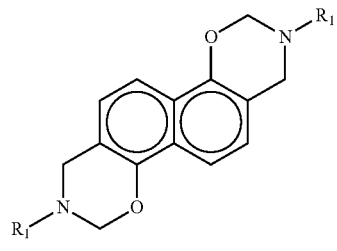

Formula 3

Reaction Scheme 2

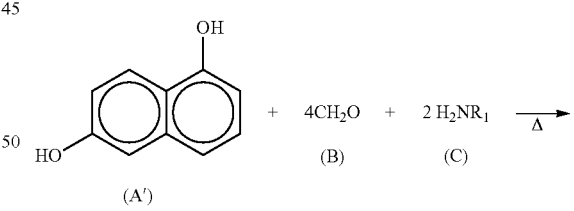

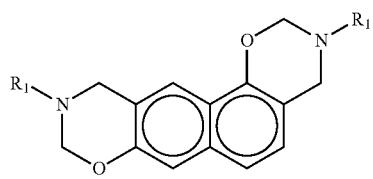

Formula 4

Hereinafter, a method of preparing the naphthoxazine benzoxazine-based monomer of Formula 1 will be described. As an embodiment of the present invention, a method of preparing the compounds represented by Formulae 3 to 5 will now Reaction Scheme 3

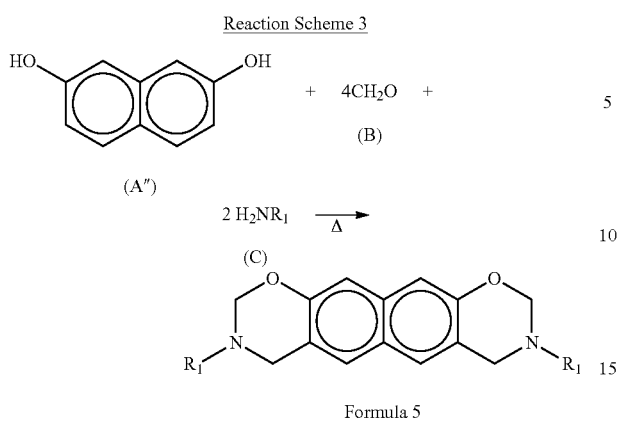

Formula 5

In Reaction Schemes 1 to 3, $R_1$ is selected from the same groups represented by the following formulae as defined in Formulae 3 to 5.

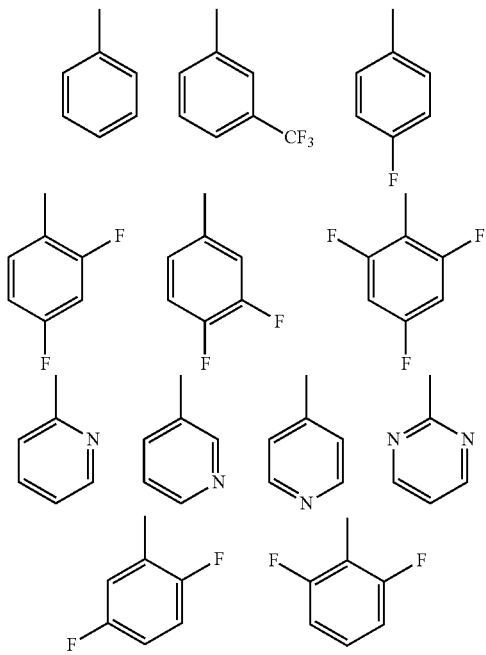

The solvent used in the reactions described above may be 1,4-dioxane, chloroform, dichloromethane, THF. The heating temperature is preferably adjusted to a temperature which can reflux the solvent, preferably to 80 to 110° C., more preferably about 110° C.

As a non-limited embodiment of the working-up process, the resultant reaction mixture is washed with an aqueous 1 N NaOH solution and water and dried using a drier such as magnesium sulfate, and then the resultant is filtered and evaporated under reduced pressure in order to remove the solvent from the resultant, and dried to obtain a target material.

The polymer can be prepared by dissolving the naphthoxazine benzoxazine-based monomer of Formula 1 in a solvent, and then polymerizing the resultant by heat treatment.

Herein, the heat treatment temperature is preferably carried out at a temperature in the range of 180 to 250° C. When the temperature is lower than 180° C., reactivity of polymerization is degraded, on the other hand, when the temperature is above 250° C., yield is reduced.

A polymerization catalyst can be used, if necessary.

Preferred solvents to be used in the polymerization reaction comprise N-methylpyrolidone (NMP), and dimethylacetamide (DMAc), and the amount of the solvent may be in the range of 5 to 30 parts by weight based on 100 parts by weight of the naphthoxazine benzoxazine-based monomer of Formula 1.

Further details regarding polybenzoxazine-based compounds of that kind are described in EP 2 055 706 A1.

In the present invention, the use of a benzoxazine-based monomer represented by Formula 1 and/or a polymer thereof is preferred.

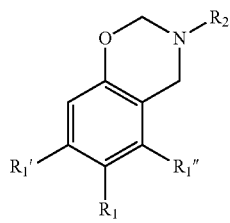

Formula 1 wherein at least one of $R_1$, $R_1'$, $R_1''$, and $R_2$ is a halogen atom, a halogenated $C_1$-$C_{20}$ alkyl group, a halogenated $C_1$-$C_{20}$ alkoxy group, a halogenated $C_2$-$C_{20}$ alkenyl group, a halogenated $C_2$-$C_{20}$ alkynyl group, a halogenated $C_6$-$C_{20}$ aryl group, a halogenated $C_6$-$C_{20}$ aryloxy group, a halogenated $C_2$-$C_{20}$ heteroaryl group, a halogenated $C_2$-$C_{20}$ heteroaryloxy group, a halogenated $C_4$-$C_{20}$ cycloalkyl group, or a halogenated $C_2$-$C_{20}$ heterocyclic group, another one of $R_1$, $R_1'$, $R_1''$, and $R_2$ is a substituted or unsubstituted non-halogenated $C_2$-$C_{20}$ heterocyclic group, and any remaining ones of $R_1$, $R_1'$, $R_1''$, and $R_2$ are hydrogen.

In Formula 1, it is preferred that at least one of $R_1$, $R_1'$, $R_1''$, and $R_2$ may be fluorine, a fluorinated $C_1$-$C_{20}$ alkyl group, a fluorinated $C_6$-$C_{20}$ aryl group, a fluorinated $C_2$-$C_{20}$ heteroaryl group, a fluorinated $C_2$-$C_{20}$ heteroaryloxy group, a fluorinated $C_4$-$C_{20}$ cycloalkyl group, or a fluorinated $C_2$-$C_{20}$ heterocyclic group, and that the other one of $R_1$, $R_1'$, $R_1''$, and $R_2$ is a nitrogen-containing $C_3$-$C_6$ heterocyclic group derived from tertiary amine such as pyridine, more preferably one of the following groups.

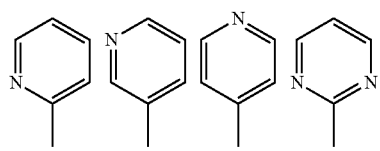

Particularly preferred fluorinated $C_6$-$C_{20}$ aryl groups are represented by the following formulae:

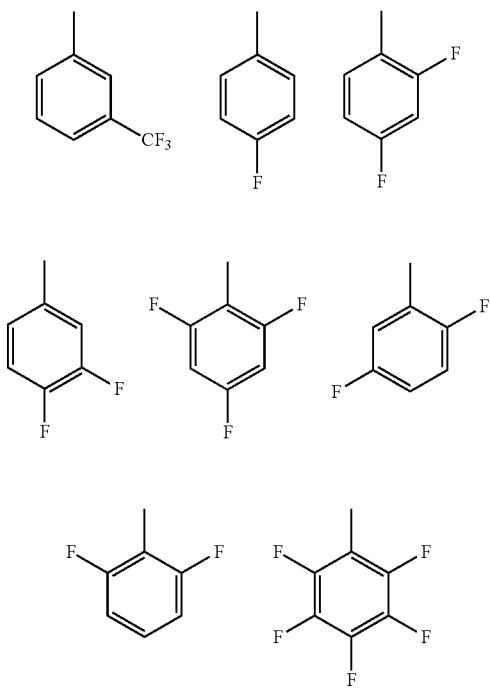

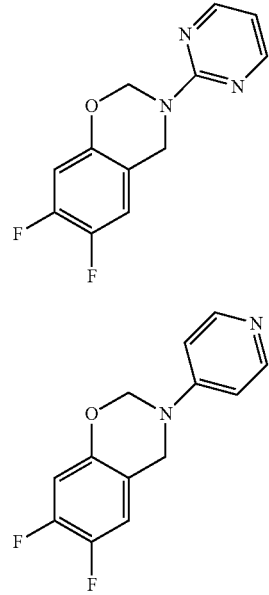

Formula 8

Formula 9

Further preferred monomers include compounds of Formulae 2 to 5:

In Formula 1, it is also preferred that at least one of $R_1$, $R_1'$, and $R_1''$ is fluorine, a fluorinated $C_1$-$C_{20}$ alkyl group, a fluorinated $C_6$-$C_{20}$ aryl group, a fluorinated $C_2$-$C_{20}$ heteroaryl group, a fluorinated $C_2$-$C_{20}$ heteroaryloxy group, a fluorinated $C_4$-$C_{20}$ cycloalkyl group, or a fluorinated $C_2$-$C_{20}$ heterocyclic group, and that $R_2$ is a nitrogen-containing $C_3$-$C_6$ heterocyclic group.

Especially preferred benzoxazine-based monomers of Formula 1 comprise compounds of Formulae 6 to 9:

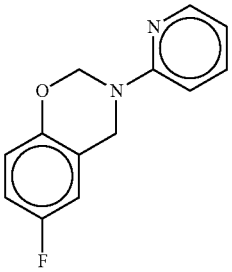

Formula 6

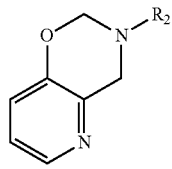

Formula 2

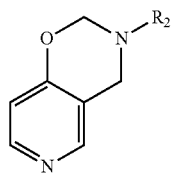

Formula 3

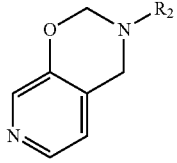

Formula 4

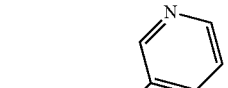

Formula 5

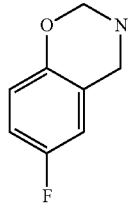

Formula 7 wherein $R_2$ is a halogen atom, a halogenated $C_1$-$C_{20}$ alkyl group, a halogenated $C_1$-$C_{20}$ alkoxy group, a halogenated $C_2$-$C_{20}$ alkenyl group, a halogenated $C_2$-$C_{20}$ alkynyl group, a halogenated $C_6$-$C_{20}$ aryl group, a halogenated $C_6$-$C_{20}$ aryloxy group, a halogenated $C_2$-$C_{20}$ heteroaryl group, a halogenated $C_2$-$C_{20}$ heteroaryloxy group, a halogenated $C_4$-$C_{20}$ cycloalkyl group, or a halogenated $C_2$-$C_{20}$ heterocyclic group.

Preferably, $R_2$ is a group represented by one of the following formulae.

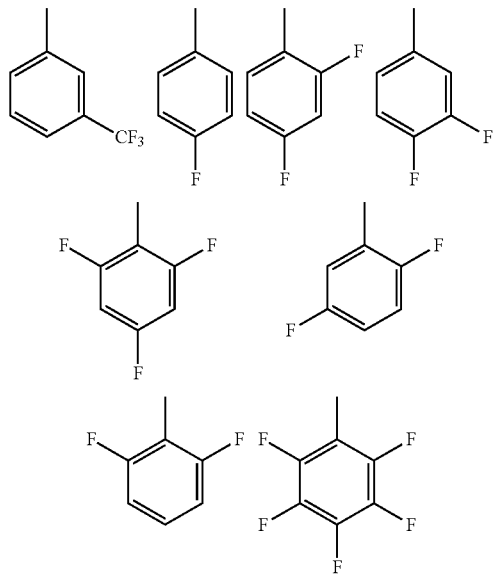

Particularly preferred examples of the monomer represented by one of Formulae 2-5 include compounds of Formulae 10 to 13.

Formula 10

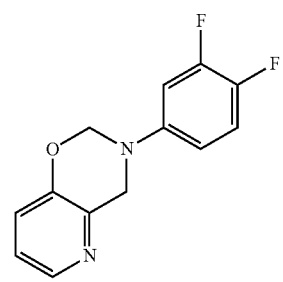

Formula 11

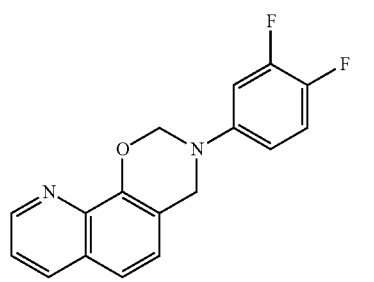

Formula 12

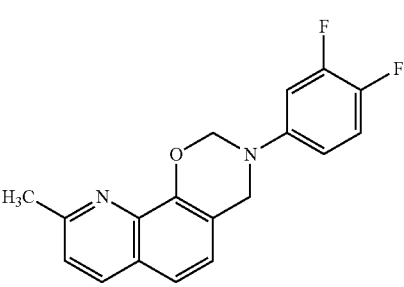

Formula 13

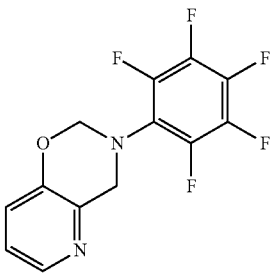

According to a preferred embodiment of the present invention, a polymer of the benzoxazine-based monomer is used, preferably a monomer according to Formulae 2-5, or more specifically, Formulae 10-13.

The benzoxazine-based monomers represented Formulae 6-9 have a fluorine or a fluorine-containing functional group as $R_1$ and a pyridyl group as $R_2$. Due to these structural properties, the benzoxazine-based monomer and a polymer thereof contain the fluorine functional group and the pyridyl group, thereby having excellent heat resistance and resistance to phosphoric acid.

In addition, the monomers represented by Formulae 10-12 and the polymers thereof have similar structural properties to those of the benzoxazine-based monomer represented by one of Formulae 6-9. That is, the monomers represented by Formulae 10-12 and the polymers thereof contain a fluorine group, thereby having improved thermal stability at a high temperature and contain a pyridine-based amine structure, thereby having improved capability of retaining acid.

The benzoxazine-based monomer of Formula 1 may be prepared according to Reaction Scheme 1 below.

Referring to Reaction Scheme 1, the benzoxazine-based monomer of Formula 2 can be prepared by heating a phenol compound (A), p-formaldehyde (B) and an amine compound (C) without a solvent or by adding a solvent to A, B and C and then refluxing the mixture, and thereafter working up the resultant:

Reaction Scheme 1

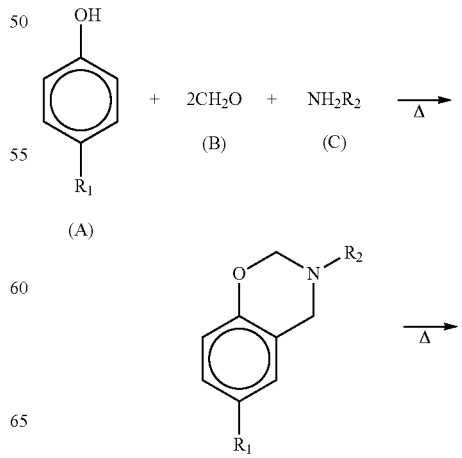

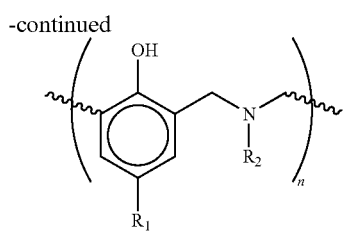

wherein $R_1$ and $R_2$ are the same as defined in Formula 1, and $R_1'$ and $R_1''$ are each independently hydrogen in the compound of Formula 1 in Reaction Scheme 1.

In the case of adding a solvent to the phenol compound (A), p-formaldehyde (B) and the amine compound (C), the solvent used may be 1,4-dioxane, chloroform, dichloromethane, THF. The heating temperature is preferably adjusted to be within a range of temperatures at which the solvent used can be refluxed.

The monomer represented by Formulae 2 to 5 and polymers thereof can be prepared in the same manner as in Reaction Scheme 1, except that a hydroxypyridine or hydroxyquinoline compound corresponding to the phenol compound (A) (such as, for example, 3-hydroxypyridine, 4-hydroxypyridine, 5-hydroxypyridine) may be used.

Further details regarding benzoxazine-based compounds of that kind are described in US 2009/0117440 A1.

In the context of the oxazine-based compounds, the following definitions are used.

The term "$C_1$-$C_{20}$ alkyl group" refers to methyl, ethyl, propyl, isobutyl, sec-butyl, pentyl, iso-amyl, hexyl. The $C_1$-$C_{20}$ alkyl group may be unsubstituted, or at least one hydrogen atom of the alkyl group may be substituted with a halogen atom, a $C_1$-$C_{20}$ alkyl group substituted with a halogen atom (for example, $CCF_3$, $CHCF_2$, $CH_2F$, $CCl_3$, and the like), a hydroxyl group, a nitro group, a cyano group, an amino group, an amidino group, hydrazine, hydrazone, a carboxyl group or a salt thereof, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

The term "$C_2$-$C_{20}$ alkenyl group" refers to vinylene, arylene. The $C_2$-$C_{20}$ alkenyl group may be unsubstituted, or at least one hydrogen atom of the alkenyl group may be substituted with one of the substituents described above with respect to the alkyl group.

The term "$C_2$-$C_{20}$ alkynyl group" refers to acetylene. The $C_2$-$C_{20}$ alkynyl group may be unsubstituted, or at least one hydrogen atom of the alkynyl group may be substituted with one of the substituents described above with respect to the alkyl group.

The term "$C_1$-$C_{20}$ alkylene group" refers to methylene, ethylene, propylene, isobutylene, sec-butylene, pentylene, iso-amylene, hexylene. The $C_1$-$C_{20}$ alkylene group may be unsubstituted, or at least one hydrogen atom of the alkylene group may be substituted with one of the substituents described above with respect to the alkyl group.

The term "$C_2$-$C_{20}$ alkenylene group" refers to an allyl group. The $C_2$-$C_{20}$ alkenylene group may be unsubstituted, or at least one hydrogen atom of the alkenylene group may be substituted with one of the substituents described above with respect to the alkyl group.

The term "$C_2$-$C_{20}$ alkynylene group" refers to a diradical acetylene group. The $C_2$-$C_{20}$ alkynylene group may be unsubstituted, or at least one hydrogen atom of the alkynylene group may be substituted with one of the substituents described above with respect to the alkyl group.

The term "cycloalkyl group" refers to a non-aromatic cyclic group having 5 to 10 carbon atoms. Particularly suitable compounds include a cyclohexyl group, and a cyclopentyl group. At least one hydrogen atom of the cycloalkyl group may be substituted with the same substituent as in the alkyl group described above.

The term "aryl group" refers to a $C_6$-$C_{20}$ carbocyclic aromatic system containing at least one ring, wherein the rings can be attached to each other pendantly method or fused with each other. The term "aryl" refers to an aromatic radical such as phenyl, naphthyl, tetrahydronaphthyl. The aryl group may be unsubstituted or may have a substituent such as haloalkylene, nitro, cyano, alkoxy, and lower alkyl amino. In particular, at least one hydrogen atom of the aryl group may be substituted with one of the substituents described above with respect to the alkyl group.

The term "arylene group" refers to a diradical $C_6$-$C_{20}$ carbocyclic aromatic system containing at least one ring, wherein the rings can be attached to each other pendantly method or fused with each other. The term "arylene" refers to an aromatic diradical, such as phenylene, naphthylene, tetrahydronaphthylene. The arylene group may have been unsubstituted or may have a substituent such as haloalkylene, nitro, cyano, alkoxy, and lower alkyl amino. In particular, at least one hydrogen atom of the arylene group may be substituted with one of the substituents described above with respect to the alkyl group.

The term "arylalkyl group" refers to a group in which at least one of the hydrogen atoms in an aryl group as defined above is substituted with a group such as lower alkyl, for example, methyl, ethyl, propyl. For example, the arylalkyl group may be benzyl, phenylethyl. At least one hydrogen atom of the arylalkyl group may be substituted with one of the substituents described above with respect to the alkyl group.

The term "heteroaryl group" refers to a monovalent, monocyclic or bicyclic aromatic bivalent organic compound which contains 1, 2 or 3 hetero atoms selected from the group consisting of N, O, P, and S and has 1 to 20 carbon atoms. Preferred heteroayl groups include pyrazinyl, furanyl, thienyl, pyridyl, pyrimidinyl, isothiazolyl, oxazolyl, thiazolyl, triazolyl, and 1,2,4-thiadiazolyl. The heteroaryl group may be unsubstituted, or at least one hydrogen atom of the heteroaryl group may be substituted with one of the substituents described above with respect to the alkyl group.

The term "fused heteroaryl group" refers to a single-ring or double-ring system composed of about 8 to 11 rings in which at least one atom is an atom other than a carbon atom such as nitrogen, oxygen or surfur. At least one of hydrogen atoms of the fused heteroaryl group can be substituted with the same functional group described above in the $C_1$-$C_{20}$ alkyl group.

The term "heteroarylene group" refers to a bivalent aromatic organic group that contains 1, 2 or 3 hetero atoms selected from the group consisting of N, O, P, and S and has 1 to 20 carbon atoms. The heteroarylene group may be unsubstituted or at least one hydrogen atom of the heteroarylene group may be substituted with one of the substituents described above with respect to the alkyl group.

The term "heteroarylalkyl group" refers to a group in which at least one of the hydrogen atoms of a heteroaryl group as described above is substituted with an alkyl group. At least one hydrogen atom of the heteroarylalkyl group may be substituted with one of the substituents described above with respect to the alkyl group.

The term "alkoxy group" refers to a univalent radical of the form Alk-O— where Alk is the alkyl group. Preferred examples of the alkoxy group are a methoxy group, an ethoxy group, and a propoxy group. At least one of hydrogen atoms in the alkoxy group can be substituted with one of the functional groups described above with respect to the alkyl group.

The term "aryloxy group" refers to a univalent radical of the form Ar—O— where Ar is the aryl group. Particularly suitable groups include a phenoxy group, a naphthyloxy group, a tetrahydronaphthyloxy group, and the like. At least one hydrogen atom of the aryloxy group may be substituted with the same substituent as in the alkyl group described above.

The term "heteroaryloxy group" refers to a radical of the form heteroaryl-O—. Particularly suitable groups include pyrazinyloxy, furanyloxy, thienyloxy, pyridyloxy, pyrimidinyloxy, isothiazolyloxy, oxazolyloxy, thiazolyloxy, triazolyloxy, and 1,2,4-thiadiazolyloxy. At least one hydrogen atom of the heteroaryloxy group may be substituted with the same substituent as in the alkyl group described above.

The term "carbocyclic group" refers to a $C_5$-$C_{10}$ non-aromatic cyclic group such as a cyclohexyl group. The carbocyclic group may be unsubstituted, or at least one hydrogen atom of the carbocyclic group may be substituted with one of the substituents described above with respect to the alkyl group.

The term "carbocyclicalkyl group" refers to a group in which at least one of the hydrogen atoms of the carbocyclic group as described above is substituted with an alkyl group. At least one hydrogen atom of the carbocyclicalkyl group may be substituted with one of the substituents described above with respect to the alkyl group.

The term "heterocyclic group" refers to a non-aromatic 5-10 membered cyclic group containing a hetero atom such as nitrogen, sulfur, phosphorus, oxygen, and the like. The heterocyclic group may be unsubstituted or at least one hydrogen atom of the heterocyclic group may be substituted with one of the substituents described above with respect to the alkyl group.

The term "fused heterocyclic group" refers to a single ring or double-ring-system of the heterocyclic group.

The term "heterocyclicalkyl group" refers to a group in which some of the hydrogen atoms of the heterocyclic group as described above are substituted with an alkyl group. At least one hydrogen atom of the heterocyclicalkyl group may be substituted with one of the substituents described above with respect to the alkyl group.

The term "halogenated" refers to substitution with a halogen atom such as fluorine, chlorine, or iodine.

The stabilization preferably takes place by heating, conveniently under inert gas, to temperatures of up to 250° C., preferably to temperature ranges of from 100° C. to 160° C., advantageously for a period of time of from 5 minutes to 120 minutes, preferably 5 minutes to 30 minutes, particularly preferably 10 minutes. The stabilized film can optionally be post-conditioned at temperatures of from 20° C. to 80° C., particularly preferably 60° C. in an acid-containing solution for 10 minutes to 60 minutes.

The implementation of the stabilization reaction in accordance with step c) may also take place by irradiation with electromagnetic waves (e.g. photochemical reaction, IR and/or UV irradiation), electrons or thermally. In the case of a thermal reaction control, it is advantageous to perform the reaction within a temperature range of from 20° C. (room temperature) to 240° C. The reaction time is from a few minutes up to several hours, depending on the reactivity of the reagent. The stabilization reaction can be performed in one or several stages.

It is also possible to successively carry out several stabilization reactions with several of the mentioned stabilizing substances.

In this connection, mention shall especially be made of reactions in which initially the formation of a second polymer within the polyazole membrane according to the invention takes place, the cross-linking of the polyazole with the previously formed second polymer component being performed subsequently. In this connection, the formed membrane may initially be treated with a monofunctional component from the compounds described above and a second, bifunctional compound may be added after the first stabilization reaction and be reacted in a second reaction step.

The strong acid used in accordance with the invention is a protic acid, preferably phosphoric acid and/or sulphuric acid.

Within the scope of the present description, "phosphoric acid" is understood to mean polyphosphoric acid, phosphonic acid ($H_3PO_3$), orthophosphoric acid ($H_3PO_4$), pyrophosphoric acid ($H_4P_2O_7$), triphosphoric acid ($H_5P_3O_{10}$), metaphosphoric acid as well as derivatives, in particular organic derivatives, such as cyclic organophosphoric acids and their derivatives, such as acid esters. The phosphoric acid, in particular orthophosphoric acid, preferably has a concentration of at least 80 percent by weight, particularly preferably a concentration of at least 90 percent by weight, even more preferably a concentration of at least 95 percent by weight and very particularly preferably a concentration of at least 98 percent by weight, the concentration values being based on the effective concentration of the acid in the membrane or during the hydrolysis.

An additional doping of the membrane may also be carried out after the stabilization in accordance with step c) to further adapt the membrane to its future use. In this connection, the additives mentioned at the outset can be added or else the degree of doping can be achieved by further addition of the mentioned strong acids. Furthermore, present water can be extracted from the membrane, e.g. by further concentration of the present strong acid. Additionally required catalysts for a stabilization reaction and mixtures of different stabilizing reagents of the above-mentioned groups can be added.

The acid-containing polyazole membrane according to the invention which is based on stabilized, preferably high-molecular weight polyazole polymers forms an acid-base complex with the acid and is thus proton-conducting even without the presence of water. This so-called Grotthus conductivity mechanism allows for the use in high-temperature fuel cells with a long-term operating temperature of at least 120° C., preferably at least 140° C., in particular at least 160° C. The membrane according to the invention can thus be used as an electrolyte for electrochemical cells, in particular fuel cells.

The acid-containing polyazole membrane according to the invention which is based on stabilized, preferably high-molecular weight polyazole polymers is characterized by improved mechanical properties. Thus, a membrane according to the invention has a modulus of elasticity of at least 3 MPa, conveniently of at least 4 MPa, preferably of at least 5 MPa, particularly preferably of at least 6 MPa, desirably of at least 7 MPa, in particular of at least 8 MPa. Furthermore, the membranes according of the invention display an elongation at break of 50% to 150%, preferably of at least 60%, in particular of at least 80%.

The tensile stress-strain properties are preferably determined with a standard tensile strength tester Zwick Z010, the following procedure having proven to be particularly advantageous. The specimens are initially conveniently cut to 1.5 cm wide and 12 cm long strips. Preferably, 2-3 specimens are prepared and measured per specimen and the results are subsequently averaged. The thickness of the specimens is preferably determined with a Mitutoyo thickness measurement device of the type Absolute Digmatic at 3 points and averaged (preferably at the beginning, centre and end of the strip). The measurement is preferably performed as follows. The specimen strip is fixed and held at a preliminary force of 0.1N for 1 min. Subsequently, the measurement is performed automatically at a tensile speed of preferably 5 mm/min, preferably at RT until the modulus of elasticity (MPa) has been determined (automatic procedure by means of the Zwick software TextExpert (version 11). The measurement is then continued with a tensile speed of preferably 30 mm/min until the specimen strip tears. The break strength ($kJ/m^2$) and the elongation at break (%) are determined when the measurement is completed.

The conductivity of the acid-containing polyazole membranes according to the invention which are based on stabilized, preferably high-molecular weight polyazole polymers is preferably at least 50 mS/cm, preferably at least 100 mS/cm, in particular at least 110 mS/cm.

The acid-containing polyazole membranes according to the invention which are based on stabilized, preferably high-molecular weight polyazole polymers are furthermore characterized by an increased stability when used as a proton-conducting membrane in high-temperature fuel cells. It has been found in the operation of such systems that—particularly in phosphoric acid systems—the stability of the acid-containing polyazole membranes should be improved even further. The membranes according to the invention are characterized by such an improved stability and are preferably insoluble in 99% phosphoric acid over a temperature range of from 85° C. to 180° C. In this connection, insoluble means that swelling in an excess of the present acid does not exceed 300% and no dissolution of the self-supporting film occurs.

The stabilized membranes according to the invention are furthermore characterized by an improved long-term stability.

Additional applications also comprise the use as an electrolyte for a display element, an electrochromic element or different sensors.

Another object of the present invention is further the preferred use of the polymer electrolyte membrane according to the invention in the individual cell (MEA) for a fuel cell.

The individual cell for a fuel cell contains at least one membrane according to the invention and two electrodes between which the proton-conducting membrane is arranged in a sandwich-like manner.

The electrodes each feature a catalytically active layer and a gas diffusion layer to supply the catalytically active layer with a reaction gas. The gas diffusion layer is porous such that reactive gas can pass through it.

The polymer electrolyte membrane according to the invention can be used as an electrolyte membrane. The electrolyte membrane as well as a precursor for an individual cell (MEA) may also be produced with one or both of the catalytically active layers. Furthermore, the individual cell can also be produced by fixing the gas diffusion layer to the precursor.

Another object of the present invention is a fuel cell with several individual cells (MEAs), each of which containing one membrane produced in accordance with above method and two electrodes between which the membrane is arranged in a sandwich-like manner.

The stabilization according to the invention may also be performed after the production of an MEA from a membrane. To this end, a doping of the membrane with the stabilizing agent is carried out as described above. However, the stabilization reaction in accordance with step c) or the activation of the stabilizing component subsequently takes place within the MEA arranged in a sandwich-like manner.

Here, the implementation of the stabilization reaction in accordance with step c) may also take place by irradiation with electromagnetic waves (e.g. photochemical reaction, IR and/or UV irradiation), electrons or thermally. In the case of a thermal reaction control, it is advantageous to perform the reaction within a temperature range of from 20° C. (room temperature) to 240° C. The stabilization particularly preferably takes place at 160-200° C. The reaction time is from a few minutes up to several hours, depending on the reactivity of the reagent. The stabilization reaction in an MEA can be performed in one or several stages (temperature ramp).

The invention will be illustrated further with several examples, without this being intended to represent any limitation of the idea of the invention.

EXAMPLES

Example 1

Route I for the Implementation of a Stabilization According to the Invention (Stabilization of Washed-Out Polyazole Films)

A film comprising preferably high-molecular weight polyazoles and a strong acid is placed in a bath with an aqueous solvent, particularly preferably pure water, at a temperature between 0° C. and 90° C., particularly preferred are 40-70° C. In the course of this, the acid contained in the film is diluted or completely washed out by replacing the solvent. In this connection, the acid can be replaced by water to an extent of 1-100%. The replacement of the solution can take from a few minutes up to several hours, depending on the applied temperature and the concentration of the solvent. In this connection, washing-out processes that take no more than one up to 120 minutes are particularly preferred. The treated film is subsequently taken out of the bath and the supernatant solvent is removed superficially, e.g. by dabbing it off with an absorbent pad.

This film is then placed in another bath which contains a strong acid and at least one of the stabilizing agents according to the invention. In this connection, the bath particularly preferably contains 0.01-30% by weight of the stabilizing component. Doping of the film by means of replacing the solvent takes place in the bath, the water previously introduced being replaced by an acidic solution with a stabilizer. In the course of this, a temperature of at least 0° C., but no more than 120° C. is particularly preferably applied. The film is then taken out of the bath and the supernatant solvent can again be absorbed, but also be left on the surface. Subsequently, the process can be continued in accordance with route I a or I b.

Route I a: The film is subsequently processed by treatment at 70-250° C. between two support films (e.g. polyethyleneterephthalate (250 μm) or also glass plates) in a heating furnace for a period of time of one minute up to 24 hours, 180-200° C. for a period of time of up to 10 hours being particularly preferred, the stabilization according to the invention taking place in the course of this. In this connection, an incremental increase and/or decrease of the temperature in the furnace is also possible. When the stabilization has been performed, the film is taken out of the solution and may (i) be further processed/used directly or else (ii) be conditioned in a bath of phosphoric acid having a concentration of 30-99%, particularly preferably 30-85%, preferably for a period of time of 30 min-24 hours. This conditioning is important, for example, to adjust the concentration of the acid contained in the film for special uses.

Route I b: Subsequently, the film is transferred to another bath which—preheated, preferably to 70-250° C.—contains a strong acid or an acid mixture and is left therein for a few minutes up to several hours, the stabilization according to the invention directly taking place in a liquid, acidic medium. In this connection, the concentration of the acid is between 10 and 99%, particularly preferably 30-85%.

When the stabilization has been performed, the film is taken out of the solution and may (i) be further processed/used directly or else (ii) be conditioned in a bath of phosphoric acid having a concentration of 30-99%, particularly preferably 30-85%, preferably for a period of time of 30 min-24 hours. This conditioning is important, for example, to adjust the concentration of the acid contained in the film for special uses.

Example 2

Route II for the Implementation of the Stabilization According to the Invention (Stabilization in a Liquid Medium)

A film comprising preferably high-molecular weight polyazoles and at least one strong acid is placed in a bath which contains a strong acid and one of the stabilizing reagents according to the invention. In this connection, the bath particularly preferably contains 0.01-30% by weight of the stabilizing substance. Doping of the film by means of replacing the solvent takes place within the bath, the aqueous solvent previously introduced being replaced by the acidic solution with the stabilizer.

In the course of this, a temperature of at least 0° C., but no more than 120° C. is particularly preferably applied. The film is then taken out of the bath and supernatant solvent can again be absorbed, but also be left on the surface of the film. Subsequently, the process is continued in accordance with route II a or route II b.

Route II a: The film is subsequently processed by treatment at 70-250° C. between two support films (e.g. polyethyleneterephthalate (250 μm) or also glass plates) for one minute up to 24 hours, 180-200° C. for a period of time of up to 10 hours being particularly preferred, the stabilization according to the invention taking place in the course of this. In this connection, an incremental increase and/or decrease of the temperature in the furnace is also possible.

When the stabilization has been performed, the film is taken out of the solution and may (i) be further processed/used directly or else (ii) be conditioned in a bath of phosphoric acid having a concentration of 30-99%, particularly preferably 30-85%, preferably for a period of time of 30 min-24 hours. This conditioning is important, for example, to adjust the concentration of the acid contained in the film for special uses.

Route II b: Subsequently, the film is transferred to another bath which—preheated, preferably to 70-250° C.—contains a strong acid or an acid mixture and is left therein for a few minutes up to several hours, the stabilization according to the invention directly taking place in a liquid, acidic medium. In this connection, the concentration of the acid is between 10 and 99%, particularly preferably 30-85%.

When the stabilization has been performed, the film is taken out of the solution and may (i) be further processed/used directly or else (ii) be conditioned in a bath of phosphoric acid having a concentration of 30-99%, particularly preferably 30-85%, preferably for a period of time of 30 min-24 hours. This conditioning is important, for example, to adjust the concentration of the acid contained in the film for special uses.

Example 3

Route III—In Situ Stabilization in a Fuel Cell (Stabilization in an MEA)

A polyazole film produced as per route I or route II and comprising preferably high-molecular weight polyazoles, at least one strong acid and a stabilizing reagent according to the invention is produced, the actual stabilization reaction (route I a or route I b or route II a or route II b, respectively) initially being dispensed with.

The film is subsequently further processed to an MEA which can take place by compression, lamination or simple stacking with two gas diffusion electrodes. Coating the produced film on both sides with a catalyst layer (e.g. platinum on carbon) and producing a catalyst-coated membrane (CCM) is also conceivable. The CCM in turn is then processed to an MEA by compression, lamination or simple stacking with two gas diffusion layers.

Subsequently, the stabilization reaction is performed directly in the MEA under an air or protective gas atmosphere at temperatures of 60-200° C. for a few minutes up to several hours. The stabilization particularly preferably takes place at 90-180° C. for 1-120 minutes.

Example 4

Route IV for the Implementation of a Stabilization According to the Invention (Stabilization by Subsequent, Superficial Coating with a Stabilizing Reagent)

When the production is completed, a self-supporting film comprising preferably high-molecular weight polyazoles and at least one strong acid is superficially sprayed or superficially coated with a solution of a stabilizing reagent and at least one strong acid, preferably phosphoric acid. The solution may then act upon the membrane, e.g. rolled up or in a continuous process, for a period of time of several minutes up to 24 hours.

A stabilization reaction according to the invention is subsequently performed or the self-supporting membrane is processed to an MEA and the stabilization reaction is performed thereafter.

TABLE 1

| | sample | | | | |
|---|---|---|---|---|---|
| | Ex1 | Ex2 | Ex3 | Ex4 | V1 |
| modification route | II a | II a | II a | III | reference |
| PBI/imbibement solution acid concentration [wt %] | 85 | 85 | 85 | 85 | None |
| Additive concentration [wt %] | 0.5 | 1.0 | 1.0 | 1.0 | None |
| Imbibement duration [h] | 1 | 1 | 1 | 1 | none |
| Stabilization temperature [° C.] | 200 | 200 | 200 | 200 | none |
| Stabilization duration [h] | 1 | 1 | 1 | 1 | none |
| post stabilization acid solution concentration [wt %] | 50 | 50 | none | none | none |
| post stabilization acid solution treatment duration [h] | 12 | 1 | none | none | none |
| post stabilization acid solution treatment temperature [° C.] | 23 | 60 | none | none | none |
| E-Modulus [Mpa] | 14.9 | 28.6 | 10.1 | n.e. | 3.5 |
| toughness [kJ/m$^2$] | 179.5 | 470.2 | 239.1 | n.e. | 263 |
| Elongation at break [%] | 80 | 93 | 72 | n.e. | 240 |
| proton conductivity 160° C. [mS/cm] | 80.3 | 92.2 | 111.8 | n.e. | 120 |
| solubility (qual. in 100% H$_3$PO$_4$ bei 160° C.) | – | – | – | – | + |

Additive: benzoxazine formular 15,
acid type for imbibement and post treatment: phosphoric acid;
n.e: not estimated
–: insoluble;
+: soluble
Example 1 to 4 demonstrate the stabilizing effect oxazine type additive by increased E-moduli of 10-28 MPa compared to 3.5 MPa of the standard membrane V1 (comparitive example).

Example 5

Route V for the Implementation of a Stabilization According to the Invention (Stabilization by Adding the Stabilization Reagent to a Polyazole/Acid Solution)

The stabilizing oxazine additive is mixed in a solution comprising a polyazole (2-40 wt % polymer content), a strong acid and a further optional additive. The solution is casted with a doctor blade on glass plates into a film and subsequently treated under nitrogen atmosphere to 70-250° C. for a few minutes up to several hours. The stabilization takes place in the liquid acid polyazole containing medium.

When the stabilization has been performed, the film is being treated in a bath of phosphoric acid having a concentration of 30-99%, particularly preferable 30-85%, preferably for a period of time of 30 min-24 hours. This conditioning is important, for example, to adjust the concentration of the acid contained in the film for special uses.

Example 6

The stabilized membranes according to the invention are also showing an improved stability under accelerated aging conditions when the membrane is embedded in a membrane electrode assembly. The membrane electrode assembly is manufactured based on the membrane and two electrodes and subsequently in a single cell testing equipment subjected to oxidizing conditions. The membrane stability is evaluated by estimating the open circuit voltage. The manufacturing of the membrane electrode sandwich based on membrane and two gas diffusion electrodes for example under hot press conditions is known to the expert and state of the art. As break-in procedure the single cell is heated to 160° C., supplied with 3-5 l/h hydrogen on the anode and 5 l/h air on the cathode. The open circuit voltage and the resistance of the cell are measured by impedance spectroscopy. The measurement of open circuit voltage and cell resistance is known to the expert and state of the art. After the break-in procedure the single cell is kept without gas supplies at 160° C. under atmospheric conditions. The measurement of the open circuit voltage is conducted two to three times per week and a decreasing open circuit voltage and increasing cell resistance considered as sign for membrane degradation. The rapid aging test is terminated when the open circuit voltage drops below 800 mV. At the beginning of life the open circuit voltage has a typical value of around 1000 mV. The membrane according to invention demonstrates a significantly improved lifetime under the current testing conditions. A standard membrane (comparative example) shows after 250 h (+/−50 h) time of exposure an open circuit voltage below 800 mV. The stabilized membranes degrade depending on the amount of oxazine additive used within 800-1200 h which means factor 3-4 slower.

TABLE 2

| OCV testing | | |
|---|---|---|
| t [h] | Example 1 [mV] | Comparative Example [mV] |
| 0 | 1001 | 949 |
| 96 | 1002 | 842 |
| 144 | | 826 |
| 264 | | 780 |
| 288 | 982 | |
| 432 | 971 | |
| 504 | 930 | |
| 672 | 907 | |
| 936 | 840 | |
| 1152 | 810 | |

Table 2 shows the decrease of the open circuit voltage for a standard membrane (comparative example) compared to a membrane stabilized with 0.5 w % benzoxazine additive according formula 15. The decrease for the standard membrane below 800 mV takes place after 250 h whereas the stabilized membrane (example 1) has a lifetime of around 1150 h.

Example 8

The stabilized membranes according to the invention are also showing an improved stability under provoking operation conditions when the membrane is embedded in a membrane electrode assembly. The membrane electrode assembly is manufactured based on the membrane and two electrodes and subsequently in a single cell testing equipment subjected to provoking operation conditions supplied with 8.1 l/h hydrogen on the anode and 6.6 l/h oxygen on the cathode. The membrane stability is evaluated by estimating the operation time at 0.35 A/cm² at 200° C. The manufacturing of the membrane electrode sandwich based on membrane and two gas diffusion electrodes for example under hot press condition is known to the expert and state of the art.

The voltage at 0.35 A/cm² at 200° C. is measured constantly and a sudden decreasing of the voltage is considered as sign for membrane electrode assembly failure and therefore as membrane degradation. The stabilized membranes according to invention demonstrate a significantly improved lifetime under the testing conditions described above. Relative to a standard membrane (comparative example) the stabilized membranes show an improved lifetime of a factor 1.5~3.

TABLE 3

| Durability at 200° C. | |
|---|---|
| | lifetime [h] |
| Example 3 | 1080 |
| Comparitive Example | 240 |

Comparative Example

A solution of 2 wt % of equimolar amounts of 3,3',4,4'-Tetraminobiphenyl and terephtalic acid in polyphosphoric acid (112 wt %) is warmed up to 280° C. within 100 h. The resulting polybenzimidazole-phosphoric acid solution is cooled down to a temperature of 100° C., casted as film on supporting material like polyethyleneterephtalate and subsequently hydrolysed in 50 wt % phosphoric acid over night at room temperature. After completion of hydrolysis the self-supporting polybenzimidazole membrane is removed from the supporting material. The properties of the polybenzimidazole membrane are listed in table 2.

The invention claimed is:

1. A method for the production of a mechanically stabilized polyazole polymer membrane or film comprising the following steps:
   a) providing a membrane or film containing
      i.) a polyazole with at least one amino group in a repeating unit except the ones obtained by reacting aromatic and/or heteroaromatic diaminocarboxylic acids,
      ii.) at least one strong acid and
      iii.) at least one stabilizing reagent, the total content of stabilizing reagents in the membrane or film being within the range of from 0.01 to 30% by weight,
   b) performing the stabilization reaction in the membrane, immediately or in a subsequent processing step of the membrane,
   c) optionally doping the membrane obtained in accordance with step b) with a strong acid or concentrating the present strong acid by removal of present water, wherein the stabilizing reagent comprises at least one oxazine-based compound and wherein the polyazole polymer has at least 1.8 dl/g intrinsic viscosity.

2. The method according to claim 1, wherein said step a) comprises the steps of:
   a1-a) producing a film comprising the polyazole with at least one amino group in a repeating unit,
   a1-b) treating the film from a) with a solution comprising
      (i) at least one strong acid and
      (ii) at least one stabilizing reagent, the total content of the stabilizing reagents in the solution being within the range of from 0.01 to 30% by weight.

3. The method according to claim 1, wherein said step a) comprises the steps of:
   a2-a) producing a solution comprising
      i.) the polyazole with at least one amino group in a repeating unit,
      ii.) at least one strong acid and
      iii.) at least one stabilizing reagent, the total content of the stabilizing reagents in the solution being within the range of from 0.01 to 30% by weight,
   a2-b) producing the membrane using the solution of step a2-a).

4. The method according to claim 1, wherein said at least one strong acid is a protic acid.

5. The method according to claim 4, wherein said at least one protic acid is based on phosphoric acid and/or sulphuric acid.

6. The method according to claim 5, wherein, the phosphoric acid is selected from the group consisting of polyphosphoric acid, phosphonic acid ($H_3PO_3$), orthophosphoric acid ($H_3PO_4$), pyrophosphoric acid ($H_4P_2O_7$), triphosphoric acid ($H_5P_3O_{10}$), metaphosphoric acid.

7. The method according to claim 5, wherein, the phosphoric acid is selected from the group consisting of polyphosphoric acid, phosphonic acid ($H_3PO_3$), orthophosphoric acid ($H_3PO_4$), pyrophosphoric acid ($H_4P_2O_7$), triphosphoric acid ($H_5P_3O_{10}$), metaphosphoric acid, cyclic organophosphoric acids or their derivatives.

8. The method according to claim 1, wherein the polyazole polymer comprises a first benzoxazine-based monomer represented by Formula 1 and/or a second benzoxazine-based monomer represented by Formula 2

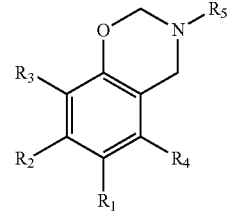

Formula 1

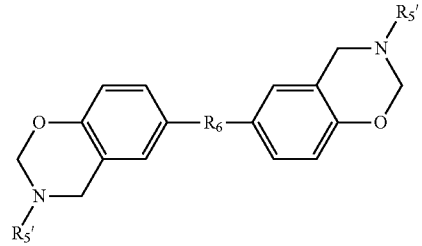

Formula 2 wherein $R_1$ to $R_4$ are each independently hydrogen, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ cycloalkyl group, a substituted or unsubstituted $C_4$-$C_{20}$ cycloalkyloxy group, a substituted or unsubstituted $C_2$-$C_{20}$ heterocycle group, a halogen atom, a hydroxyl group, or a cyano group;

$R_5$ is a halogenated $C_1$-$C_{20}$ alkyl group, a halogenated $C_1$-$C_{20}$ alkoxy group, a halogenated $C_2$-$C_{20}$ alkenyl group, a halogenated $C_2$-$C_{20}$ alkynyl group, a halogenated $C_6$-$C_{20}$ aryl group, a halogenated $C_6$-$C_{20}$ aryloxy group, a halogenated $C_7$-$C_{20}$ arylalkyl group, a halogenated $C_2$-$C_{20}$ heteroaryl group, a halogenated $C_2$-$C_{20}$ heteroaryloxy group, a halogenated $C_2$-$C_{20}$ heteroarylalkyl group, a halogenated $C_4$-$C_{20}$ carbocycle group, a halogenated $C_4$-$C_{20}$ carbocyclicalkyl group, a halogenated $C_2$-$C_{20}$ heterocycle group, or a halogenated $C_2$-$C_{20}$ heterocyclicalkyl group;

$R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocycle group, a substituted or unsubstituted $C_4$-$C_{20}$ carbocyclicalkyl group, a substituted or unsubstituted $C_2$-$C_{20}$ heterocycle group, or a substituted or unsubstituted $C_2$-$C_{20}$ heterocyclicalkyl group;

$R_6$ is selected from the group consisting of a substituted or unsubstituted alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—.

9. The method according to claim 1, wherein the polyazole polymer comprises a first benzoxazine-based monomer represented by Formula 1 below and/or a second benzoxazine-based monomer represented by Formula 2

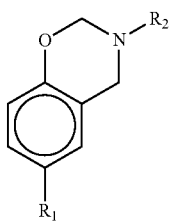

Formula 1

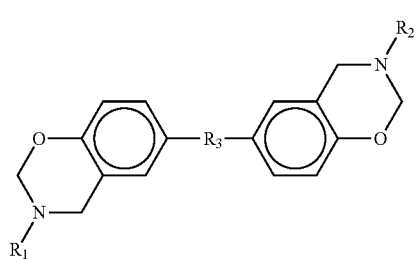

Formula 2 where, $R_1$ is a hydrogen atom, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_2$-$C_{20}$ heteroaryl group, a substituted or unsubstituted $C_4$-$C_{20}$ cycloalkyl group or a substituted or unsubstituted $C_2$-$C_{20}$ heterocyclic group, a halogen atom, a hydroxy group, or a cyano group;

$R_2$ is a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_2$-$C_{20}$ heteroaryl group, a substituted or unsubstituted $C_3$-$C_{20}$ heteroarylalkyl group, a substituted or unsubstituted $C_4$-$C_{20}$ carbocyclic group, a substituted or unsubstituted $C_5$-$C_{20}$ carbocyclic alkyl group, a substituted or unsubstituted $C_2$-$C_{20}$ heterocyclic group, or a substituted or unsubstituted $C_3$-$C_{20}$ heterocyclic alkyl group;

$R_3$, is a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, or —SO$_2$—.

10. The method according to claim 1, wherein the polyazole polymer comprises a benzoxazine-based compound represented by Formula 1

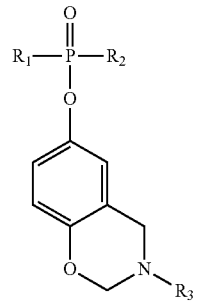

Formula 1 wherein $R_1$ and $R_2$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by the formula below,

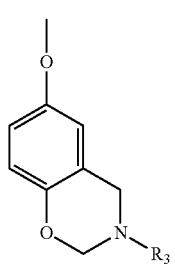

wherein $R_3$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ cycloalkyl group, a halogenated $C_4$-$C_{20}$ cycloalkyl group, a $C_1$-$C_{20}$ heterocyclic group or a halogenated $C_1$-$C_{20}$ heterocyclic group.

11. The method according to claim 1, wherein the polyazole polymer comprises a benzoxazine-based monomer represented by Formula 1

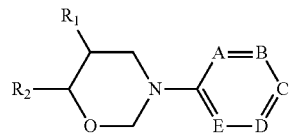

Formula 1 wherein

A, B, C, D and E are carbon, or one or two of A, B, C, D and E is nitrogen and the others are carbon, and $R_1$ and $R_2$ are connected to each other to form a ring, wherein the ring is a $C_6$-$C_{10}$ cycloalkyl group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group.

12. The method according to claim 1, wherein the stabilizing reagent comprises a phosphorous containing monomer represented by Formula 1

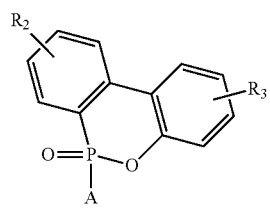

Formula 1 wherein A is a substituted or unsubstituted $C_1$-$C_{20}$ heterocycle group, a substituted or unsubstituted $C_4$-$C_{20}$ cycloalkyl group, or a substituted or unsubstituted $C_1$-$C_{20}$ alkyl group, and $R_2$ and $R_3$ are each independently hydrogen, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocycle group, a halogen atom, a cyano group, or a hydroxyl group, the monomer comprises at least one oxazine-based moiety.

13. The method according to claim 1, wherein the polyazole polymer comprises a naphthoxazine benzoxazine-based monomer represented by Formula 1

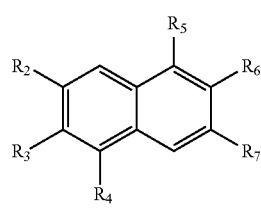

Formula 1 wherein $R_2$ and $R_3$ or $R_3$ and $R_4$ are linked to each other to form a group represented by Formula 2 below, $R_5$ and $R_6$ or $R_6$ and $R_7$ are linked to each other to form a group represented by Formula 2 below, and

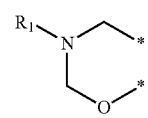

Formula 2 wherein $R_1$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocycle group, a substituted or unsubstituted $C_4$-$C_{20}$ carbocyclic alkyl group, a substituted or unsubstituted $C_2$-$C_{20}$ heterocycle group, or a substituted or unsubstituted $C_2$-$C_{20}$ heterocyclic alkyl group.

14. The method according to claim 1, wherein the polyazole polymer comprises a benzoxazine-based monomer represented by Formula 1

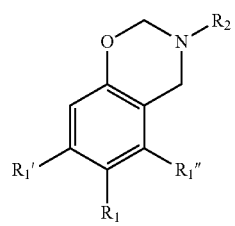

Formula 1 wherein at least one of $R_1$, $R_1'$, $R_1''$, and $R_2$ is a halogen atom, a halogenated $C_1$-$C_{20}$ alkyl group, a halogenated $C_1$-$C_{20}$ alkoxy group, a halogenated $C_2$-$C_{20}$ alkenyl group, a halogenated $C_2$-$C_{20}$ alkynyl group, a halogenated $C_6$-$C_{20}$ aryl group, a halogenated $C_6$-$C_{20}$ aryloxy group, a halogenated $C_2$-$C_{20}$ heteroaryl group, a halogenated $C_2$-$C_{20}$ heteroaryloxy group, a halogenated $C_4$-$C_{20}$ cycloalkyl group, or a halogenated $C_2$-$C_{20}$ heterocyclic group;

another one of $R_1$, $R_1'$, $R_1''$, and $R_2$ is a substituted or unsubstituted non-halogenated $C_2$-$C_{20}$ heterocyclic group;

and any remaining ones of $R_1$, $R_1'$, $R_1''$, and $R_2$ are hydrogen.

15. A membrane obtained in accordance with the method according to claim 1.

16. The membrane according to claim 15, wherein the membrane has a modulus of elasticity of at least 3 MPa.

17. The membrane according to claim 15, wherein the membrane it has a solubility of less than 0.5% by weight of polyazole polymer in 99% phosphoric acid over a temperature range of from 85° C. to 120° C.

18. A membrane electrode assembly comprising at least one membrane according to claim 15.

19. A fuel cell comprising at least one membrane electrode assembly according to claim 18.
20. The method according to claim 1, wherein the polyazole polymer has at least 2.5 dl/g intrinsic viscosity.
21. The method according to claim 1, which further comprises a stabilizer which comprises a compound of the formula (a)-(h)
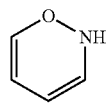
(a)
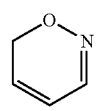
(b)
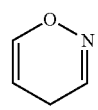
(c)
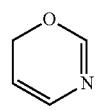
(d)
-continued
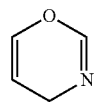
(e)
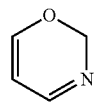
(f)
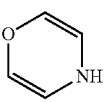
(g)
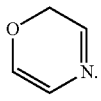
(h)
* * * * *